(12) United States Patent
Robinson et al.

(10) Patent No.: US 9,350,980 B2
(45) Date of Patent: May 24, 2016

(54) CROSSTALK SUPPRESSION IN A DIRECTIONAL BACKLIGHT

(71) Applicant: REALD INC., Beverly Hills, CA (US)

(72) Inventors: Michael G. Robinson, Boulder, CO (US); Graham J. Woodgate, Henley on Thames (GB); Jonathan Harrold, Leamington Spa (GB); Gary D. Sharp, Boulder, CO (US); Miller H. Schuck, Erie, CO (US)

(73) Assignee: RealD Inc., Beverly Hills, CA (US)

( * ) Notice: Subject to any disclaimer, the term of this patent is extended or adjusted under 35 U.S.C. 154(b) by 559 days.

(21) Appl. No.: 13/836,443

(22) Filed: Mar. 15, 2013

(65) Prior Publication Data

US 2013/0307946 A1    Nov. 21, 2013

Related U.S. Application Data

(60) Provisional application No. 61/648,942, filed on May 18, 2012, provisional application No. 61/649,136, filed on May 18, 2012.

(51) Int. Cl.
*H04N 13/04* (2006.01)
*F21V 8/00* (2006.01)
*G02B 27/22* (2006.01)

(52) U.S. Cl.
CPC .......... *H04N 13/0413* (2013.01); *G02B 6/0048* (2013.01); *G02B 6/0055* (2013.01); *G02B 6/0068* (2013.01); *G02B 27/22* (2013.01); *H04N 13/0418* (2013.01); *G02B 6/0051* (2013.01)

(58) Field of Classification Search
CPC combination set(s) only.
See application file for complete search history.

(56) References Cited

U.S. PATENT DOCUMENTS

| | | | |
|---|---|---|---|
| 2,133,121 | A | 10/1938 | Stearns |
| 2,810,905 | A | 10/1957 | Barlow |
| 5,347,644 | A | 9/1994 | Sedlmayr |
| 5,703,667 | A | 12/1997 | Ochiai |

(Continued)

FOREIGN PATENT DOCUMENTS

| | | |
|---|---|---|
| EP | 0939273 | 1/1999 |
| EP | 0860729 B1 | 7/2006 |

(Continued)

OTHER PUBLICATIONS

International search report and written opinion of international searching authority for co-pending PCT application No. PCT/US2013/041192 mailed Aug. 28, 2013.

(Continued)

*Primary Examiner* — Christopher S Kelley
*Assistant Examiner* — Asmamaw G Tarko
(74) *Attorney, Agent, or Firm* — Neil G. J. Mothew; Penny L. Lowry

(57) ABSTRACT

Disclosed is a light guiding valve apparatus including a light valve, a two dimensional light emitting element array and an input side arranged to reduce light reflection for providing large area directional illumination from localized light emitting elements with low cross talk. A waveguide includes a stepped structure, in which the steps may include extraction features hidden to guided light propagating in a first forward direction. Returning light propagating in a second backward direction may be refracted or reflected by the features to provide discrete illumination beams exiting from the top surface of the waveguide. Stray light falling onto a light input side of the waveguide is at least partially absorbed.

25 Claims, 37 Drawing Sheets

(56) References Cited

U.S. PATENT DOCUMENTS

| | | | |
|---|---|---|---|
| 5,727,107 A | 3/1998 | Umemoto et al. | |
| 5,771,066 A | 6/1998 | Barnea | |
| 5,896,225 A | 4/1999 | Chikazawa | |
| 5,903,388 A | 5/1999 | Sedlmayr | |
| 5,959,664 A | 9/1999 | Wooodgate | |
| 5,971,559 A | 10/1999 | Ishikawa et al. | |
| 6,014,164 A | 1/2000 | Woodgate et al. | |
| 6,061,489 A * | 5/2000 | Ezra | G02B 27/0093 313/115 |
| 6,075,557 A | 6/2000 | Holliman et al. | |
| 6,108,059 A | 8/2000 | Yang | |
| 6,144,118 A | 11/2000 | Cahill et al. | |
| 6,199,995 B1 | 3/2001 | Umemoto | |
| 6,305,813 B1 | 10/2001 | Lekson et al. | |
| 6,464,365 B1 | 10/2002 | Gunn et al. | |
| 6,663,254 B2 | 12/2003 | Ohsumi | |
| 6,847,488 B2 | 1/2005 | Travis | |
| 6,870,671 B2 | 3/2005 | Travis | |
| 6,883,919 B2 | 4/2005 | Travis | |
| 7,052,168 B2 | 5/2006 | Epstein et al. | |
| 7,058,252 B2 | 6/2006 | Woodgate | |
| 7,073,933 B2 * | 7/2006 | Gotoh | G02B 6/0016 362/23.09 |
| 7,101,048 B2 | 9/2006 | Travis | |
| 7,136,031 B2 | 11/2006 | Lee et al. | |
| 7,215,415 B2 | 5/2007 | Maehara | |
| 7,410,286 B2 | 8/2008 | Travis | |
| 7,430,358 B2 | 9/2008 | Qi et al. | |
| 7,528,893 B2 | 5/2009 | Schultz | |
| 7,545,429 B2 | 6/2009 | Travis | |
| 7,660,047 B1 * | 2/2010 | Travis | G06F 3/042 359/726 |
| 7,750,981 B2 | 7/2010 | Shestak | |
| 7,750,982 B2 | 7/2010 | Nelson | |
| 7,944,428 B2 | 5/2011 | Travis | |
| 7,970,246 B2 | 6/2011 | Travis | |
| 7,976,208 B2 | 7/2011 | Travis | |
| 8,016,475 B2 | 9/2011 | Travis | |
| 8,216,405 B2 | 7/2012 | Emerton | |
| 8,223,296 B2 | 7/2012 | Lee et al. | |
| 8,325,295 B2 * | 12/2012 | Sugita | G02B 6/003 349/62 |
| 8,354,806 B2 | 1/2013 | Travis | |
| 8,477,261 B2 | 7/2013 | Travis | |
| 8,534,901 B2 | 9/2013 | Panagotacos | |
| 8,556,491 B2 | 10/2013 | Lee | |
| 8,651,725 B2 | 2/2014 | Le et al. | |
| 8,714,804 B2 | 5/2014 | Kim et al. | |
| 2002/0113866 A1 | 8/2002 | Taniguchi et al. | |
| 2003/0137738 A1 | 7/2003 | Ozawa et al. | |
| 2004/0008877 A1 * | 1/2004 | Leppard | G01M 11/0214 382/141 |
| 2004/0105264 A1 * | 6/2004 | Spero | B60Q 1/04 362/276 |
| 2004/0108971 A1 | 6/2004 | Waldern et al. | |
| 2004/0170011 A1 | 9/2004 | Kim et al. | |
| 2004/0263968 A1 | 12/2004 | Kobayashi et al. | |
| 2005/0007753 A1 * | 1/2005 | Van Hees | G02B 6/0031 362/612 |
| 2005/0135116 A1 | 6/2005 | Epstein et al. | |
| 2005/0180167 A1 | 8/2005 | Hoelen et al. | |
| 2005/0264717 A1 * | 12/2005 | Chien | G02B 27/225 349/61 |
| 2005/0276071 A1 | 12/2005 | Sasagawa et al. | |
| 2006/0056166 A1 * | 3/2006 | Yeo | G02B 6/0041 362/19 |
| 2006/0132423 A1 | 6/2006 | Travis | |
| 2006/0139447 A1 | 6/2006 | Unkrich | |
| 2006/0158729 A1 | 7/2006 | Vissenberg et al. | |
| 2006/0215129 A1 | 9/2006 | Alasaarela et al. | |
| 2006/0269213 A1 | 11/2006 | Hwang et al. | |
| 2006/0291053 A1 | 12/2006 | Robinson et al. | |
| 2006/0291243 A1 | 12/2006 | Niioka et al. | |
| 2007/0025680 A1 | 2/2007 | Winston et al. | |
| 2007/0081110 A1 * | 4/2007 | Lee | G02B 6/0053 349/61 |
| 2007/0085105 A1 * | 4/2007 | Beeson | H01L 33/58 257/100 |
| 2007/0115552 A1 | 5/2007 | Robinson et al. | |
| 2007/0188667 A1 | 8/2007 | Schwerdtner | |
| 2007/0223252 A1 | 9/2007 | Lee et al. | |
| 2008/0084519 A1 | 4/2008 | Brigham et al. | |
| 2008/0086289 A1 | 4/2008 | Brott | |
| 2008/0225205 A1 | 9/2008 | Travis | |
| 2008/0259012 A1 | 10/2008 | Fergason | |
| 2008/0297431 A1 * | 12/2008 | Yuuki | G02F 1/133615 345/1.1 |
| 2008/0297459 A1 | 12/2008 | Sugimoto et al. | |
| 2008/0304282 A1 | 12/2008 | Mi et al. | |
| 2008/0316768 A1 | 12/2008 | Travis | |
| 2009/0016057 A1 | 1/2009 | Rinko | |
| 2009/0067156 A1 | 3/2009 | Bonnett et al. | |
| 2009/0140656 A1 | 6/2009 | Kohashikawa et al. | |
| 2009/0160757 A1 | 6/2009 | Robinson | |
| 2009/0190079 A1 | 7/2009 | Saitoh | |
| 2009/0225380 A1 | 9/2009 | Schwerdtner et al. | |
| 2009/0278936 A1 | 11/2009 | Pastoor et al. | |
| 2010/0034987 A1 * | 2/2010 | Fujii | B32B 27/18 428/1.1 |
| 2010/0053771 A1 | 3/2010 | Travis | |
| 2010/0091254 A1 | 4/2010 | Travis | |
| 2010/0165598 A1 | 7/2010 | Chen et al. | |
| 2010/0177387 A1 | 7/2010 | Travis | |
| 2010/0188438 A1 | 7/2010 | Kang | |
| 2010/0188602 A1 | 7/2010 | Feng | |
| 2010/0214135 A1 | 8/2010 | Bathiche | |
| 2010/0220260 A1 | 9/2010 | Sugita et al. | |
| 2010/0231498 A1 | 9/2010 | Large | |
| 2010/0277575 A1 | 11/2010 | Ismael et al. | |
| 2010/0278480 A1 | 11/2010 | Vasylyev | |
| 2010/0295930 A1 | 11/2010 | Ezhov | |
| 2010/0300608 A1 | 12/2010 | Emerton et al. | |
| 2011/0032483 A1 | 2/2011 | Hruska et al. | |
| 2011/0032724 A1 * | 2/2011 | Kinoshita | F21K 9/56 362/552 |
| 2011/0044056 A1 | 2/2011 | Travis | |
| 2011/0044579 A1 | 2/2011 | Travis et al. | |
| 2011/0051237 A1 | 3/2011 | Hasegawa et al. | |
| 2011/0187293 A1 | 8/2011 | Travis | |
| 2011/0188120 A1 | 8/2011 | Tabirian et al. | |
| 2011/0216266 A1 | 9/2011 | Travis | |
| 2011/0242298 A1 * | 10/2011 | Bathiche | G02B 26/108 348/54 |
| 2011/0255303 A1 | 10/2011 | Nichol et al. | |
| 2011/0285927 A1 * | 11/2011 | Schultz | H04N 13/0418 349/15 |
| 2011/0310232 A1 | 12/2011 | Wilson et al. | |
| 2012/0002136 A1 | 1/2012 | Nagata et al. | |
| 2012/0013720 A1 | 1/2012 | Kadowaki et al. | |
| 2012/0127573 A1 | 5/2012 | Robinson et al. | |
| 2012/0206050 A1 * | 8/2012 | Spero | B60Q 1/04 315/152 |
| 2012/0243204 A1 | 9/2012 | Robinson et al. | |
| 2012/0243261 A1 * | 9/2012 | Yamamoto | H01L 25/0753 362/613 |
| 2013/0101253 A1 | 4/2013 | Popovich et al. | |
| 2013/0135588 A1 | 5/2013 | Popovich et al. | |

FOREIGN PATENT DOCUMENTS

| | | |
|---|---|---|
| EP | 2003394 | 12/2008 |
| JP | 08-237691 A | 9/1996 |
| JP | 08254617 A | 10/1996 |
| JP | 08340556 A | 12/1996 |
| JP | 2000-200049 A | 7/2000 |
| JP | 2001093321 A | 4/2001 |
| JP | 2002049004 A | 2/2002 |
| JP | 2003-215705 A | 7/2003 |
| JP | 2004319364 A | 11/2004 |
| JP | 2005135844 A | 5/2005 |
| JP | 2005183030 | 7/2005 |
| JP | 2005-259361 A | 9/2005 |
| JP | 2006004877 | 1/2006 |

(56) References Cited

FOREIGN PATENT DOCUMENTS

| | | |
|---|---|---|
| JP | 2006031941 A | 2/2006 |
| JP | 3968742 B2 | 8/2007 |
| JP | 2008204874 A | 9/2008 |
| KR | 1020030064258 | 7/2003 |
| KR | 10-0932304 B1 | 12/2009 |
| KR | 1020110006773 A | 1/2011 |
| KR | 1020110017918 A | 2/2011 |
| KR | 1020110067534 A | 6/2011 |
| KR | 10-2012-004989 A | 5/2012 |
| KR | 1020120048301 A | 5/2012 |
| WO | 01-61241 A1 | 8/2001 |

OTHER PUBLICATIONS

International search report and written opinion of international searching authority for co-pending PCT application No. PCT/US2013/041619 mailed Aug. 27, 2013.
International search report and written opinion of international searching authority for co-pending PCT application No. PCT/US2013/041655 mailed Aug. 27, 2013.
International search report and written opinion of international searching authority for co-pending PCT application No. PCT/US2013/041703 mailed Aug. 27, 2013.
International search report and written opinion of international searching authority for co-pending PCT application No. PCT/US2013/041548 mailed Aug. 27, 2013.
International search report and written opinion of international searching authority for co-pending PCT application No. PCT/US2013/041683 mailed Aug. 27, 2013.
International search report and written opinion of international searching authority for co-pending PCT application No. PCT/US2013/041228 mailed Aug. 23, 2013.
International search report and written opinion of international searching authority for co-pending PCT application No. PCT/US2013/041235 mailed Aug. 23, 2013.
International search report and written opinion of international searching authority for co-pending PCT application No. PCT/US2013/041697 mailed Aug. 23, 2013.
International search report and written opinion of international searching authority for PCT application PCT/US2013/063133 mailed Jan. 20, 2014.
International search report and written opinion of international searching authority for PCT application PCT/US2013/063125 mailed Jan. 20, 2014.
International search report and written opinion of international searching authority for PCT application PCT/US2013/077288 mailed Apr. 18, 2014.
International search report and written opinion of international searching authority for PCT application PCT/US2014/017779 mailed May 28, 2014.
Kalantar, Kalil et al. "Backlight Unit With Double Surface Light Emission," J. Soc. Inf. Display, vol. 12, Issue 4, pp. 379-387 (Dec. 2004).
Tabiryan et al., "The Promise of Diffractive Waveplates," Optics and Photonics News, vol. 21, Issue 3, pp. 40-45 (Mar. 2010).
International search report and written opinion of international searching authority in PCT/US2012/042279 dated Feb. 26, 2013.
International search report and written opinion of international searching authority in PCT/US2012/037677 dated Jun. 29, 2012.
International search report and written opinion of international searching authority in PCT/US2011/061511 dated Jun. 29, 2012.
Kalantar, et al. "Backlight Unit With Double Surface Light Emission," J. Soc. Inf. Display, vol. 12, Issue 4, pp. 379-387 (Dec. 2004).
International search report and written opinion of the international searching authority from PCT/US12/052189 dated Jan. 29, 2013.
International Preliminary Report on Patentability in PCT/US2011/061511 dated May 21, 2013.
Travis, et al. "Backlight for view-sequential autostereo 3D".

\* cited by examiner

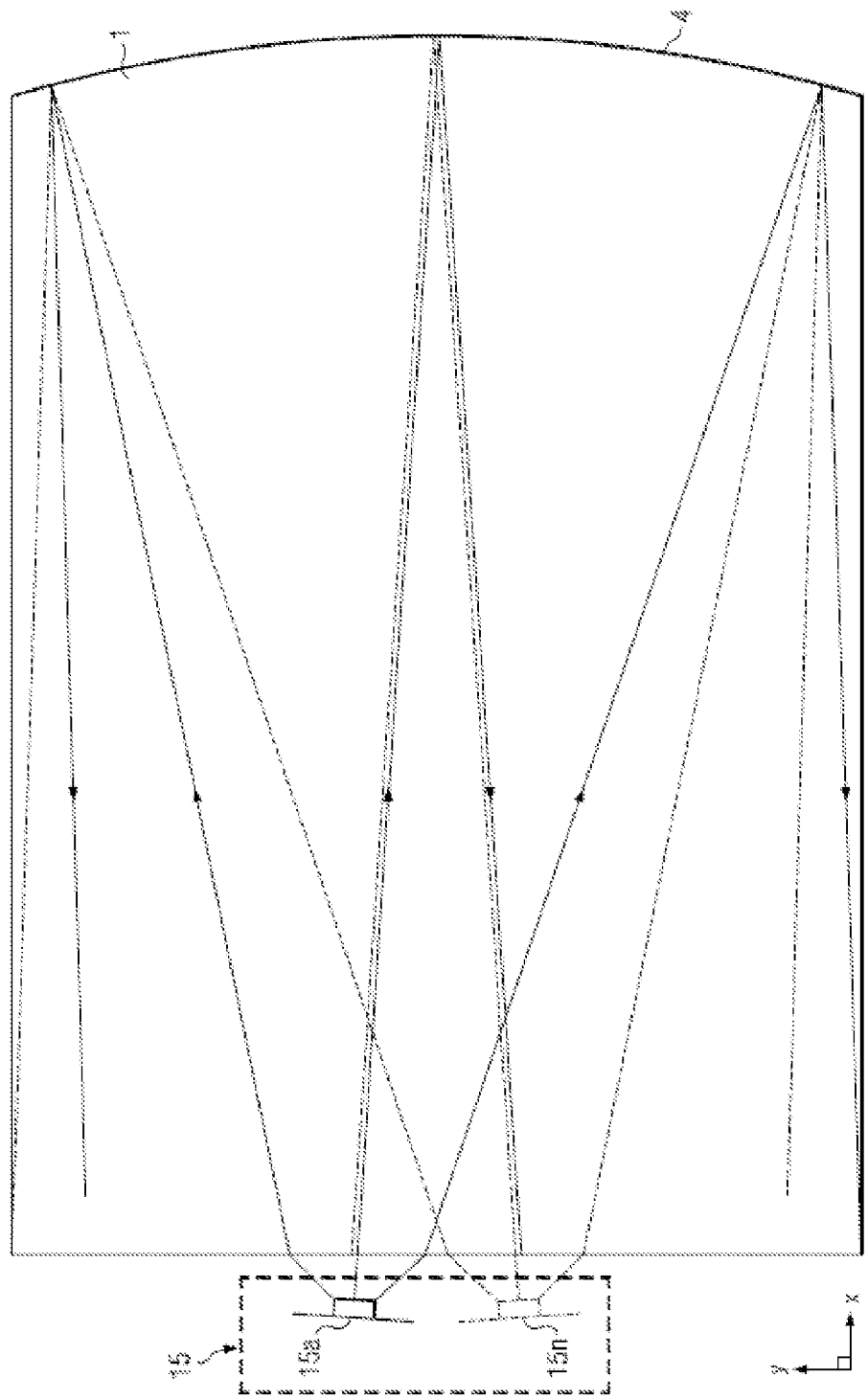

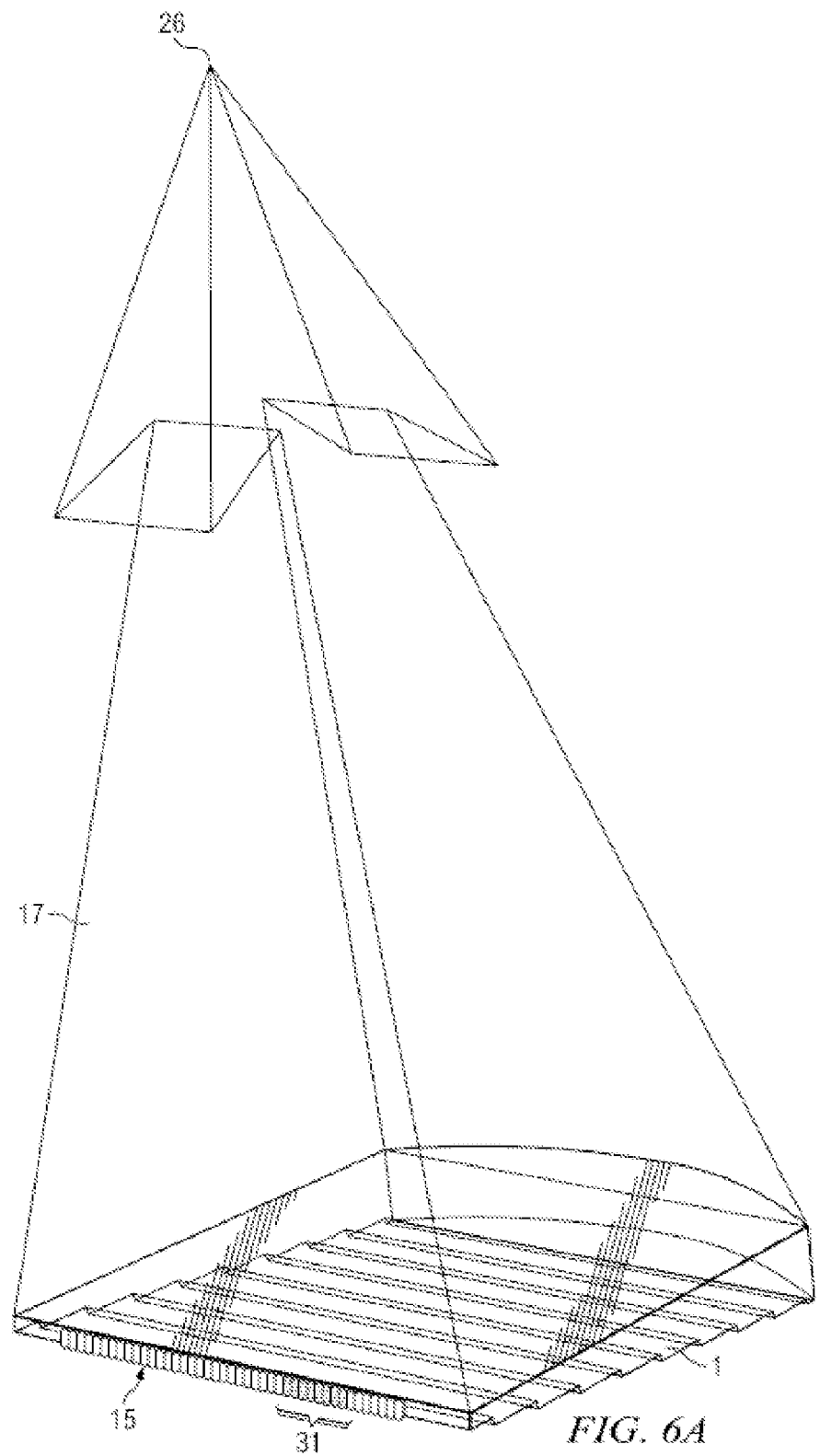

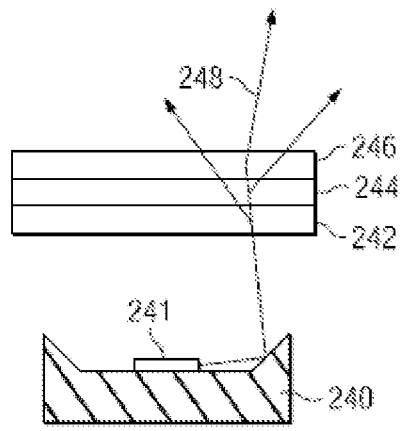
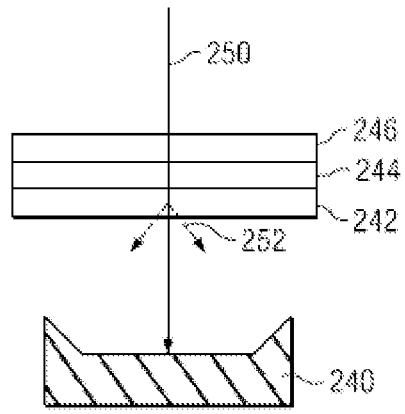
FIG. 36    FIG. 37
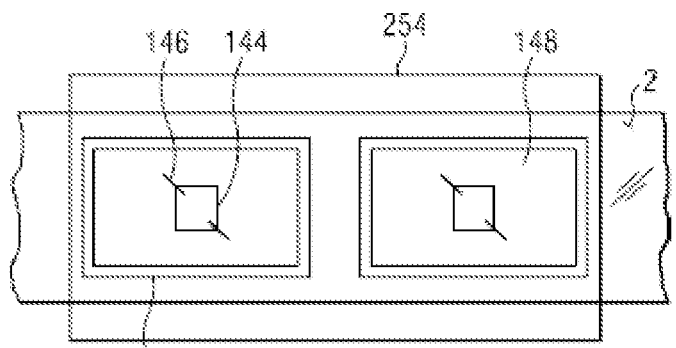
FIG. 38
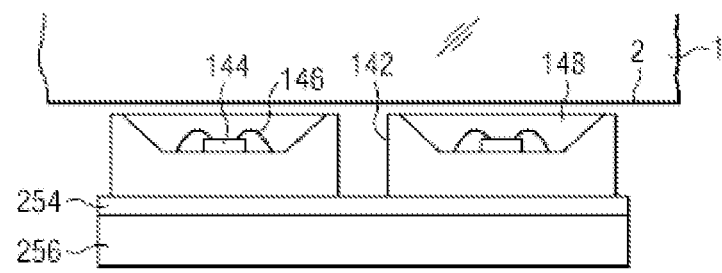
FIG. 39

CROSSTALK SUPPRESSION IN A DIRECTIONAL BACKLIGHT

CROSS-REFERENCE TO RELATED APPLICATIONS

This application claims priority to U.S. Provisional Patent Application No. 61/648,942, entitled "Cross talk suppression apparatus and method thereof," filed May 18, 2012; and to U.S. Provisional Patent Application No. 61/649,136, entitled "Diffractive reflectors for imaging directional backlights," filed May 18, 2012, the entireties of which are herein incorporated by reference.

TECHNICAL FIELD

This disclosure generally relates to illumination of light modulation devices, and more specifically relates to means for control of stray light in light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can include addressing electronics in the spatial light modulator.

BRIEF SUMMARY

According to a first aspect of the present disclosure, there is provided a directional backlight for a transmissive spatial light modulator which may include a waveguide. The waveguide may have an input end, first and second opposed guide surfaces for guiding light along the waveguide, and a reflective end facing the input end for reflecting light from the input light back through the waveguide. The directional backlight may also include an array of light sources arranged to output light predominantly in an emission band and in a conversion band. The light sources may be disposed at different input positions in a lateral direction across the input end of the waveguide. The waveguide may be arranged to direct input light from light sources, at the different input positions across the input end, as output light through the first guide surface after reflection from the reflective end for supply through a transmissive spatial light modulator into optical windows in respective output directions. The output directions may be distributed in the lateral direction in dependence on the input positions. The directional backlight may also include a reflection reduction element arranged to reduce reflections of light incident on the input end after reflection from the reflective end.

Light reflected from the reflective end and incident on the input end generally is lost from the system, reducing overall system efficiency. However, some of the light incident on the input end after reflection from the reflective end may be further reflected back into the waveguide by means of Fresnel reflections at the input end rather than exiting the waveguide, which may be referred to herein as reflection artifacts. The present embodiments may reduce image artifacts that may be otherwise achieved by the further reflected light. In particular, undesirable image cross talk may be reduced so that autostereoscopic 3D images with increased depth and reduced visual strain may be produced by the display. Further, line artifacts arising from said multiple reflections of rays at the input end may be reduced or eliminated.

The reflection reduction element may take various forms.

The reflection reduction element may be a light diffusing element which may have asymmetric light diffusing properties.

Advantageously, the diffuser may reduce reflection artifacts arising from specular reflections at the input end and thus achieve a reduction in line artifacts by increasing the angular spread of the reflected light so that line artifacts are distributed across the display area and visibility is minimized. The asymmetric diffusing properties may achieve an angular spreading of the light in the x-y plane, with reduced spreading in the x-z plane, thus reducing light loss for input light from the light sources at the input end.

In one example, the reflection reduction element may be a linear polarizer, in which case the directional backlight may further include a phase retarder element at the reflective end.

Advantageously the linear polarizer and phase retarder may cooperate to rotate the polarization of light from the light sources, so that the reflected light incident on the input end is absorbed by the input polarizer before Fresnel reflection that may occur at the input end if that end were to be in air. Thus the undesirable reflection artifacts are reduced, improving image quality and reducing image artifacts.

In another example, the reflection reduction element may cover at least the light sources and may be operable so that portions of the reflection reduction element adjacent respective light sources may selectively transmit light when the respective adjacent light source is operated and otherwise may absorb light incident on the input end after reflection from the reflective end.

Advantageously, the regions of the input end in alignment with operating light sources may achieve high throughput efficiency and regions not in alignment with the operating light sources may achieve high absorption, reducing the reflection artifacts for light reflected from the input end in the respective regions not in alignment with the operating light sources.

The reflection reduction element may include a filter, which may be disposed between the input end and the light sources, and arranged to absorb light in the conversion band preferentially over light in the emission band.

Some of the light that is reflected from the reflective end and is then incident on the input end may be transmitted by the input end and be incident on the light source. Such light may be scattered and reflected by elements of the light source and be directed back into the waveguide. Such light can produce undesirable visual artifacts including cross talk. Typically the conversion element such as a phosphor of a light source may be reflective to light in the conversion band, and may have a relatively large area in comparison to the emission element such as a semiconductor emitter of the light source. Advantageously the filter may reduce the intensity of reflected light from the light source preferentially for light in the conversion band, thus the reflectivity of the light source for the larger part of its emitting area may be preferentially reduced while enabling transmission of light in the emission band. Further, input light in the conversion band from the light source undergoes a single pass through the filter, whereas reflected light has a double pass; thus the reflected light is preferentially absorbed in comparison to the input light. The visual artifacts arising from scattering and reflection of reflected light at the light source may be reduced.

The reflection reduction element may include at least one light absorbing element covering part of the area of the respective light source and arranged to absorb light after reflection from the reflective end. The at least one light absorbing element may be disposed between the input end and each of the light sources.

Reflected light may be thus be absorbed by the input filter over part of the light source, reducing the intensity of reflection artifacts from the light source. Input light may further be recycled by the optical filter whereas reflected light may be absorbed by the input filter. Advantageously the intensity of the input light may be enhanced in comparison to uniform filters whereas a portion of the reflected light may be absorbed, thus reducing reflectivity of the light source and reducing visual artifacts.

According to a second aspect of the present disclosure, there may be provided a light source including a substrate, a light generation element supported on the substrate which may be arranged to generate light in an emission band, and a wavelength conversion material supported on the substrate. The wavelength conversion material may be arranged to convert light in the emission band generated by the light generation element substantially into light in a conversion band. The substrate may be colored to reflect the emission band preferentially over the conversion band.

Light output from the light source may be incident on the package of the light source after a reflection, for example in waveguide which the light source illuminates. Desirably, the reflectivity of the light source to the reflected light is reduced. The package may achieve a high reflectivity for light in the emission band and low reflectivity for light in the conversion band. Emitted light in the emission band may be reflected by the package, and forward scattered light in the conversion band may be outputted from the package without substantial reflections from the package, achieving high output efficiency of the package. Reflected light in the conversion band may be absorbed by the package. Reflected light in the emission band may be further converted by the conversion element and absorbed by the package. Advantageously, high output efficiency may be achieved while high absorption of reflected light may be achieved, reducing reflection artifacts.

According to a third aspect of the present disclosure, there may be provided a directional backlight for a transmissive spatial light modulator, which may include a waveguide. The waveguide may have an input end, first and second opposed guide surfaces for guiding light along the waveguide, and a reflective end facing the input end for reflecting light from the input light back through the waveguide. The directional backlight may also include an array of light sources arranged to output light predominantly in an emission band and in a conversion band. The light sources may be disposed at different input positions in a lateral direction across the input end of the waveguide. The waveguide may be arranged to direct input light from light sources, at the different input positions across the input end, as output light through the first guide surface after reflection from the reflective end for supply through a transmissive spatial light modulator into respective optical windows in output directions. The output directions may be distributed in the lateral direction in dependence on the input positions. The light sources may have respective light emitting regions having a width, in a direction along the input end in which the light sources are arrayed, which is approximately at or below 50% of the pitch of the light sources.

The emitting region may be advantageously arranged to have high output efficiency and luminous emittance. The area of the light source is reduced and gaps between the light sources are absorbing so that the total area of reflecting light source may be reduced and the total area reflectivity correspondingly reduced. Advantageously the reflection artifacts may be reduced.

According to a further aspect of the present disclosure, there may be provided an optical valve for guiding light, which may include a first light guiding surface, and a second light guiding surface opposite the first light guiding surface. The second light guiding surface may further include a plurality of guiding features and a plurality of extraction features. The plurality of extraction features may be operable to direct light to pass with substantially low loss when the light is propagating in a first direction. Further, the optical valve for guiding light may include a light input surface which may be located at a first end of the optical valve, and at least one of the light input surface or an array of illuminator elements may include at least one reflection reduction optical element.

According to a further aspect of the present disclosure, there may be provided a stepped imaging directional backlight, which may include a first light directing side and a second light directing side located opposite the first light directing side. The second light directing side may include a plurality of guiding features and a plurality of extraction features. The plurality of extraction features may be operable to direct light to pass with substantially low loss when the light is propagating in a first direction. The stepped imaging directional backlight may further include an array of illuminator elements located at a first end of the stepped imaging directional backlight, and the first end of the stepped imaging directional backlight may be located between the first and second light directing side. Additionally, at least one reflection reduction optical element may be located at the first end of the stepped imaging directional backlight.

According to a further aspect of the present disclosure, there may be provided a directional illumination system which may include a light extraction element for guiding and extracting light. The light extraction element may include a first section operable to allow light rays to spread and a second section which may include a first light guiding surface and a second light guiding surface opposite the first light guiding surface. The second light guiding surface may include at least one guiding feature and a plurality of extraction features and the extraction features may direct light to exit the light extraction element. The light extraction element may further include a first illumination input surface located between the first and second light guiding surfaces. The first illumination input surface may be operable to receive light from a first array of light sources. The light extraction element may also include at least one reflection reduction optical element located at the first end of the light extraction element.

According to a further aspect of the present disclosure, there may be provided a directional backlight display system which may include a first light extraction element. The first light extraction element may include a first light guiding surface and a second light guiding surface opposite the first light guiding surface. The second light guiding surface may further include a plurality of guiding features and a plurality of extraction features. The plurality of extraction features may direct light to pass with substantially low loss when the light is propagating in a first direction. The directional backlight display system may include a spatial light modulator proximate to the first light extraction element. Additionally, the directional backlight display system may include at least one reflection reduction optical element located at a first end of the first light extraction element.

According to the present disclosure, an optical valve for guiding light may include a first light guiding surface and a second light guiding surface opposite the first light guiding surface. The second light guiding surface may include a plurality of guiding features and a plurality of extraction features, in which the plurality of extraction features may be operable to direct light to pass with substantially low loss when the light is propagating in a first direction. The optical valve may further include a light input surface located at a first end of the optical valve, in which at least one of the light input surface or an array of illuminator elements may include at least one reflection reduction optical element.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. patent application Ser. No. 13/300,293, which is herein incorporated by reference, in its entirety.

The present embodiments may achieve reduction of stray light propagating within an imaging directional backlight apparatus. In autostereoscopic display apparatus, such a reduction advantageously may achieve improved 3D image cross talk, greater viewing comfort and higher image depth to be presented. In privacy displays, a higher degree of separation of view data may be provided, thus improving the privacy function. In flat area cameras, higher contrast capture may be achieved.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices.

Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

The various embodiments and/or aspects of the present disclosure may be applied together in any combination. It should be noted that the figures as illustrated herein may not be drawn to scale and are illustrated as such for discussion purposes only and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 1A is a schematic diagram illustrating a front view of light propagation in one embodiment of a directional display device, in accordance with the present disclosure;

FIG. 6A is a schematic diagram illustrating one embodiment of the generation of a first viewing window in a time multiplexed imaging directional display device in a first time slot, in accordance with the present disclosure;

FIG. 36 is a schematic diagram illustrating a illuminator element for illuminating a waveguide, including an ultraviolet illuminator element, in accordance with the present disclosure;

FIG. 37 is a schematic diagram illustrating generation of stray light in an alternative arrangement of illuminator elements, in accordance with the present disclosure;

FIG. 38 is a schematic diagram illustrating in front view an arrangement of illuminator elements, in accordance with the present disclosure;

FIG. 39 is a schematic diagram illustrating in side view, the arrangement of FIG. 38, in accordance with the present disclosure;

DETAILED DESCRIPTION

Figure 1B:
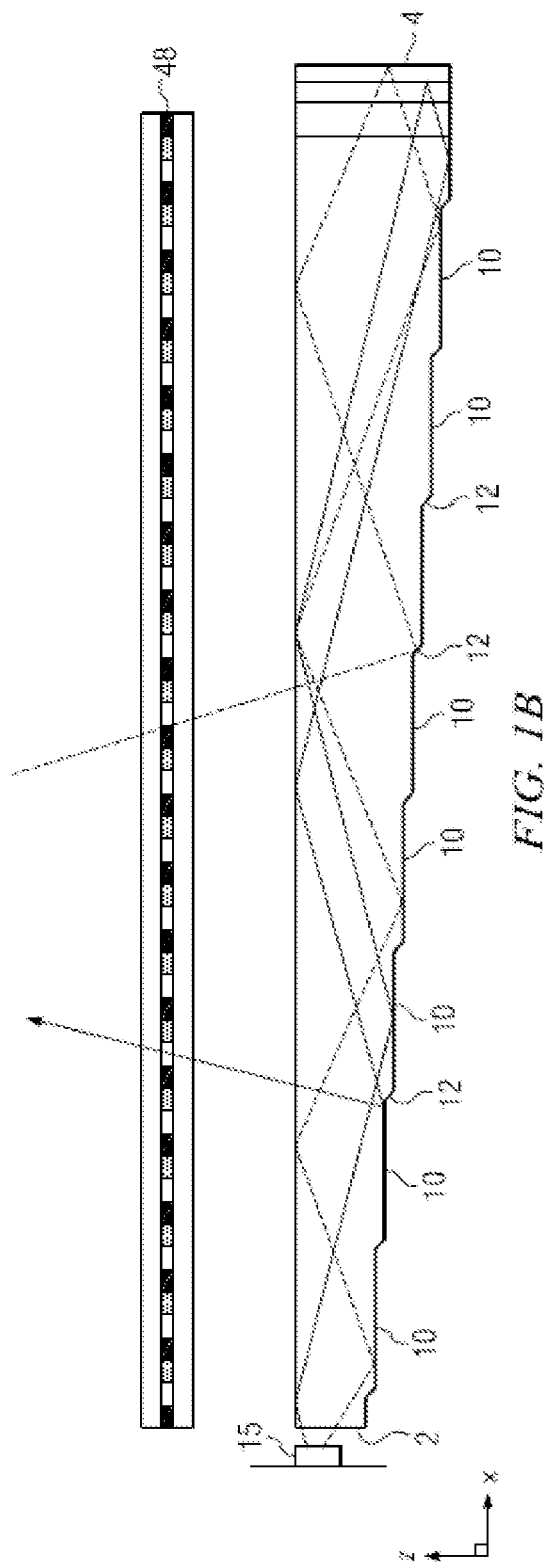
FIG. 1B is a schematic diagram illustrating a side view of light propagation in one embodiment of the directional display device of FIG. 1A, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293, which is herein incorporated by reference in its entirety.

As used herein, examples of an imaging directional backlight include a stepped waveguide imaging directional backlight, a folded imaging directional backlight, a wedge type directional backlight, or an optical valve.

Additionally, as used herein, a stepped waveguide imaging directional backlight may be an optical valve. A stepped waveguide is a waveguide for an imaging directional backlight. The imaging directional backlight may include a waveguide for guiding light, further including a first light guiding surface; and a second light guiding surface, opposite the first light guiding surface, further including a plurality of light guiding features interspersed with a plurality of extraction features arranged as steps.

Moreover, as used, a folded imaging directional backlight may be at least one of a wedge type directional backlight, or an optical valve.

In operation, light may propagate within an exemplary optical valve in a first direction from an input end to a reflective end and may be transmitted substantially without loss. Light may be reflected at the reflective end and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources. Light sources may also be referred to as light emitting elements, illuminator elements, illuminator elements, and so forth. that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM (spatial light modulator) 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1 by total internal reflection. The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example, upwards in FIG. 1B, that is supplied to the SLM 48.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape including the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. The curved end side 4 may also be referred to herein as reflective end 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation. The illuminator array 15 may be referred to herein as a light source illuminator array, illumination array, light source illumination array, and so forth for discussion purposes only.

Light sources may include light generation elements such as Light Emitting Diodes (LEDs) that may be organic or preferably inorganic LEDs due to their high luminous emittance and high efficiency. Alternative light sources may include but are not limited to lasers, fluorescent light sources, phosphorescent light sources, incandescent light sources, electroluminescent light sources, gas discharge light sources, and electron stimulated light sources.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input end 2 then enables light to exit from the entire first light directing side 6 and propagate at different external angles, as illustrated in FIG. 1A.

Figure 2A:
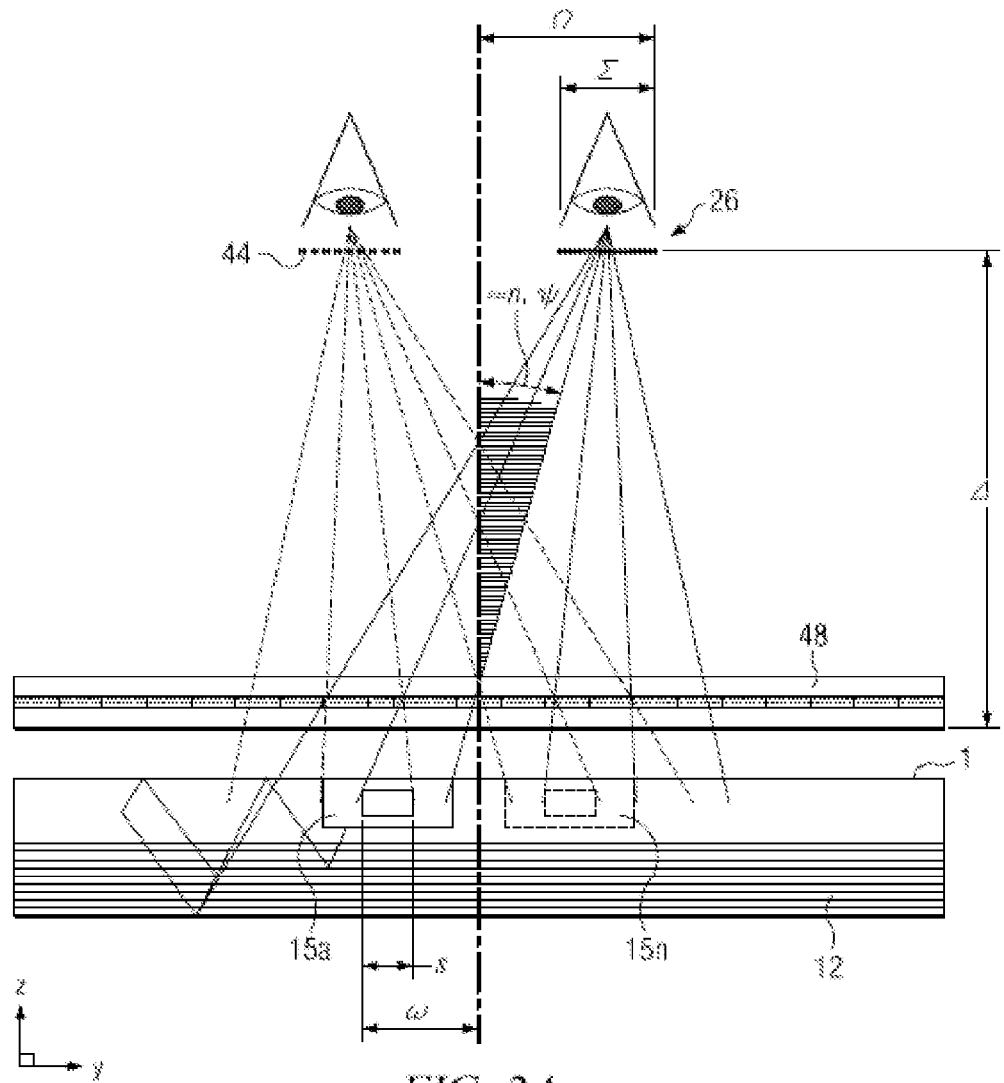
FIG. 2A is a schematic diagram illustrating in a top view of light propagation in another embodiment of a directional display device, in accordance with the present disclosure.
Figure 2B:
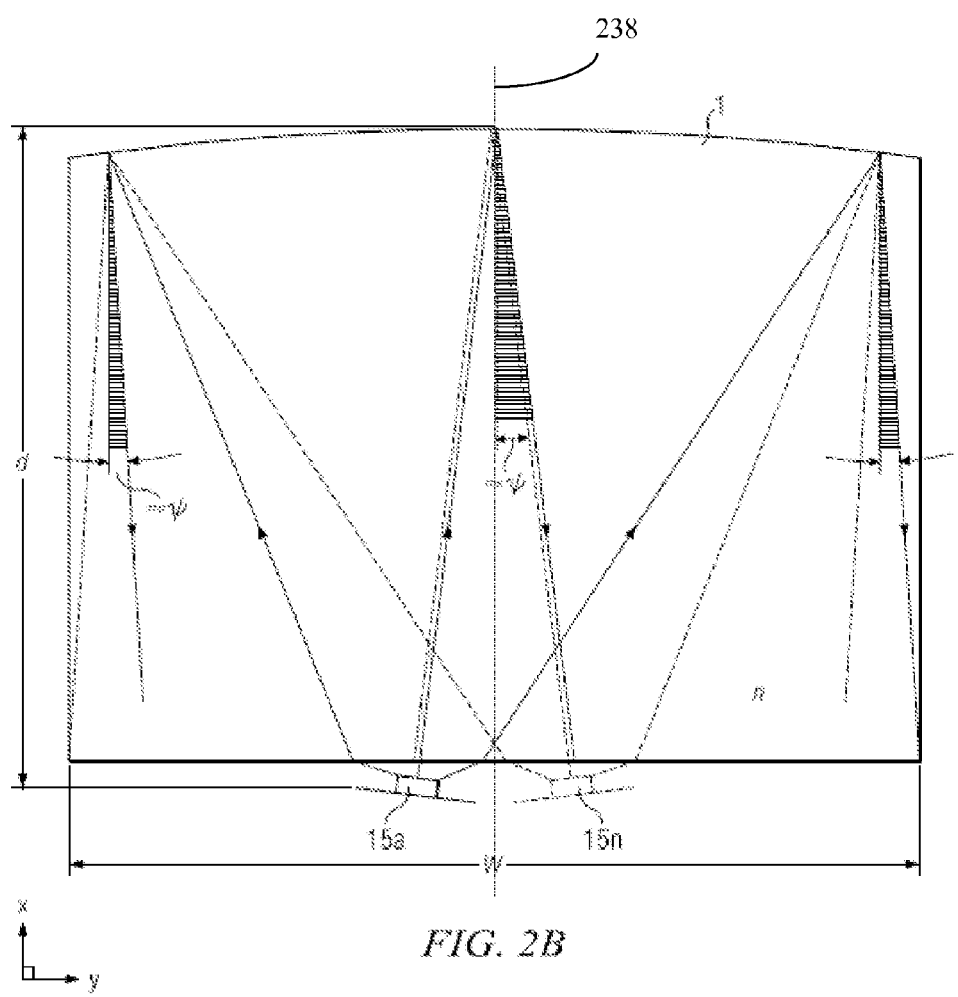
FIG. 2B is a schematic diagram illustrating light propagation in a front view of the directional display device of FIG. 2A, in accordance with the present disclosure.
Figure 2C:
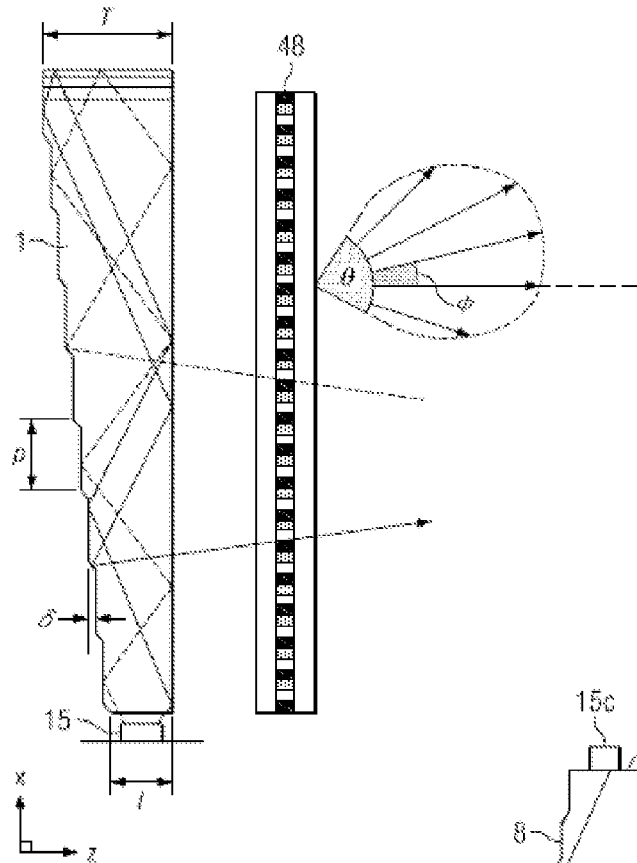
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

In one embodiment, a stepped waveguide 1 may include an input end 2 which may be thin and a reflective end 4 which may be thicker than the input end 2. In one embodiment the reflective end may have positive optical power. The stepped waveguide 1 may also include a first guide surface 6 and a second guide surface 8. The second guide surface 8 may include extraction features 10 and guiding features 12. The first guide surface 6 may be arranged to guide light by total internal reflection and the second guide surface may have a plurality of light extraction features oriented to reflect light guided through the waveguide in directions allowing exit through the first guide surface as the output light. The light extraction features 10 may be facets of the second guide surface. The second guide surface may include facets and regions alternating with the facets that may be arranged to direct light through the waveguide without substantially extracting it.

In another embodiment, the first guide surface of another waveguide may be arranged to guide light by total internal reflection and the second guide surface may be substantially planar and inclined at an angle to reflect light in directions that break the total internal reflection for outputting light through the first guide surface. The display device may further include a deflection element extending across the first guide surface of the waveguide for deflecting light towards the normal to the spatial light modulator. The reflective end may have positive optical power.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically include a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically include a spherical profile to optimize performance for on-axis and off-axis viewing positions. Other profiles may be used.

Figure 3:
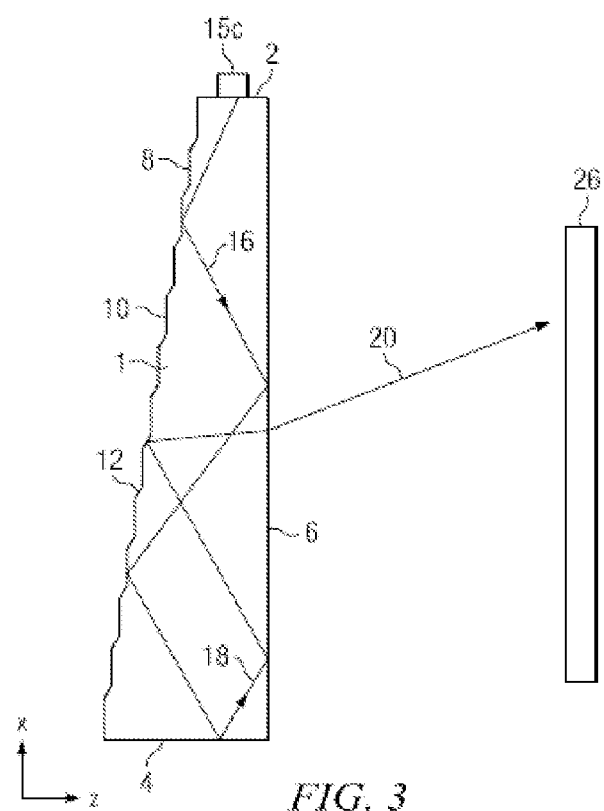
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input end 2, a reflective end 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective end 4, which may be a mirrored surface. Although reflective end 4 may be a mirrored surface and may reflect light, it may in some embodiments also be possible for light to pass through reflective end 4.

Continuing the discussion of FIG. 3, light ray 18 reflected by the reflective end 4 may be further guided in the stepped waveguide 1 by total internal reflection at the reflective end 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input end 2. Thus each viewing window 26 represents a range of separate output directions with respect to the surface normal direction of the spatial light modulator 48 that intersect with a plane at the nominal viewing distance.

Figure 4A:
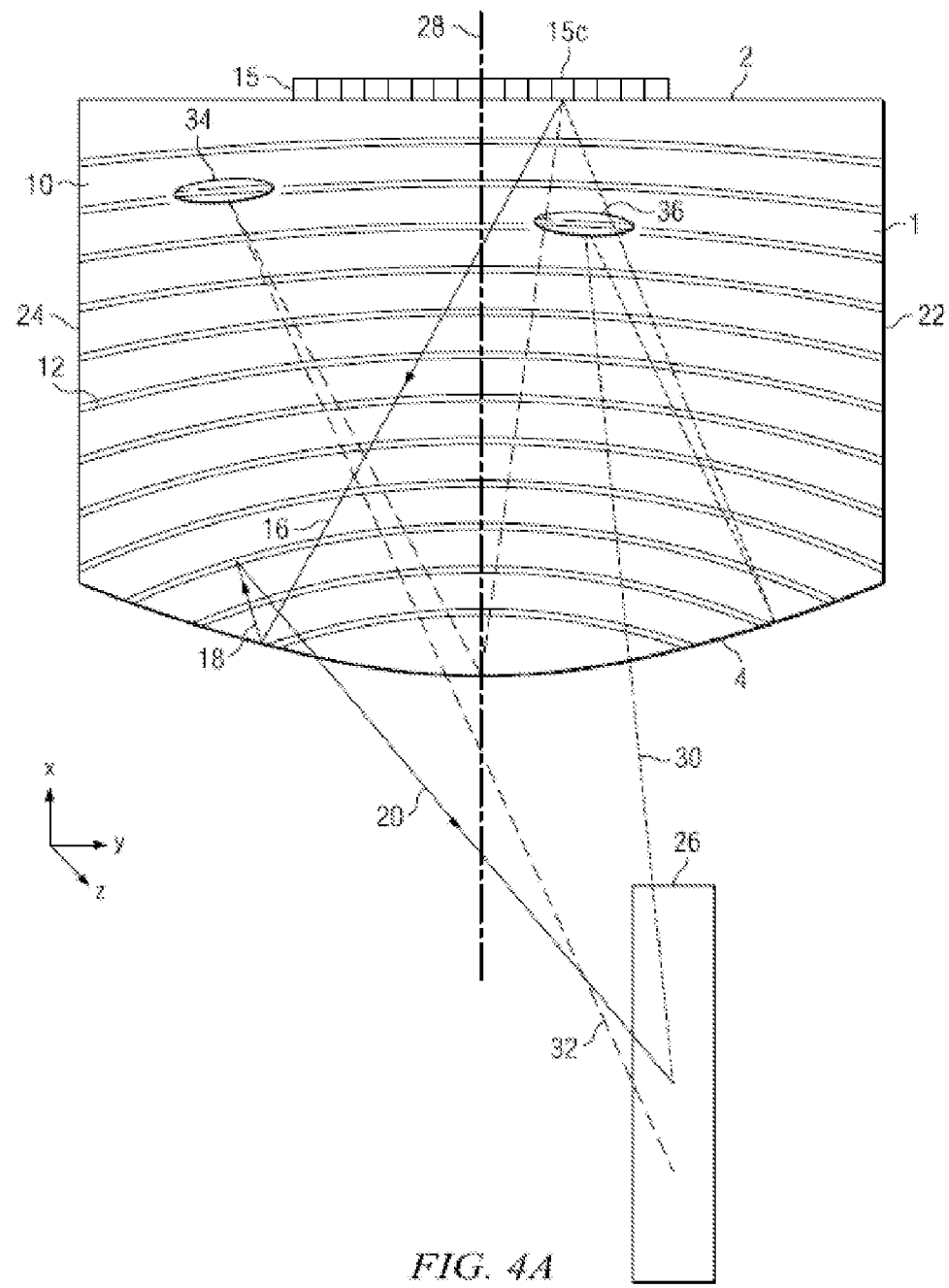
FIG. 4A is schematic diagram illustrating in a front view, generation of a viewing window in a directional display device including curved light extraction features, in accordance with the present disclosure.

FIG. 4A is a schematic diagram illustrating in front view a directional display device which may be illuminated by a first illuminator element and including curved light extraction features. In FIG. 4A, the directional backlight may include the stepped waveguide 1 and the light source illuminator array 15. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
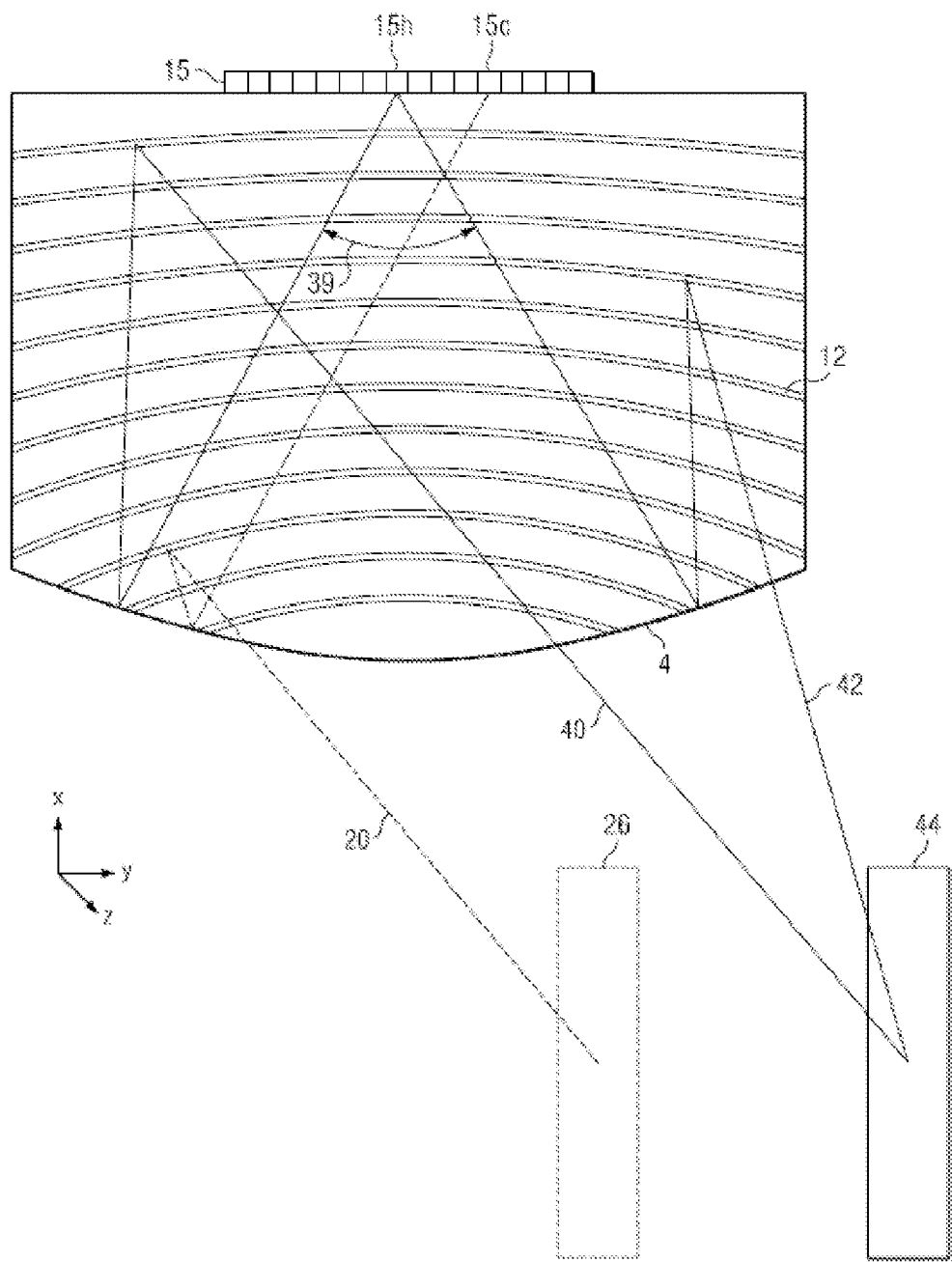
FIG. 4B is a schematic diagram illustrating in a front view, generation of a first and a second viewing window in a directional display device including curved light extraction features, in accordance with the present disclosure.

FIG. 4B is a schematic diagram illustrating in front view a directional display device which may illuminated by a second illuminator element. Further, FIG. 4B shows the light rays 40, 42 from a second illuminator element 15h of the illuminator array 15. The curvature of the reflective surface on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective end 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
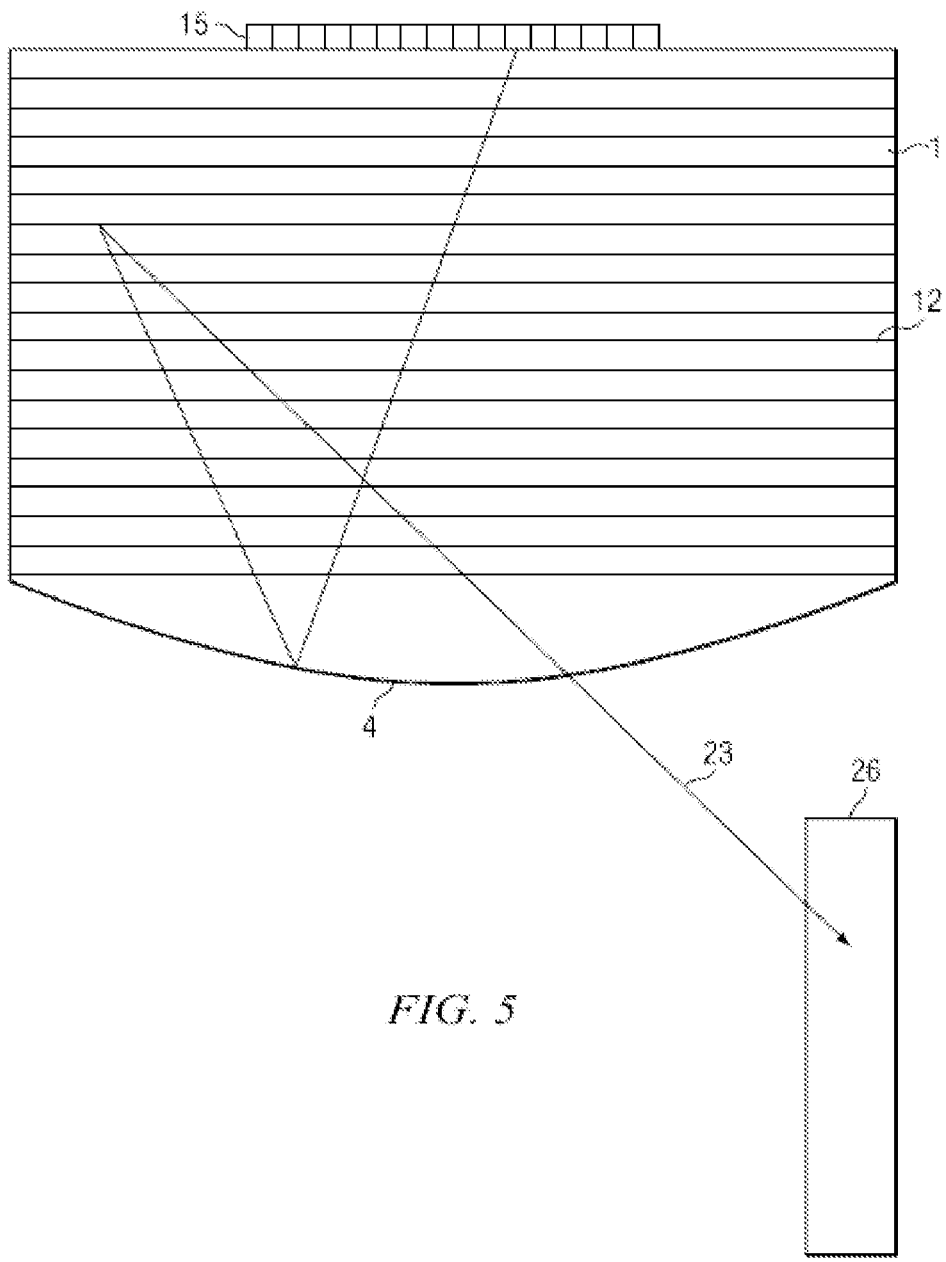
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device including a waveguide 1 having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6B:
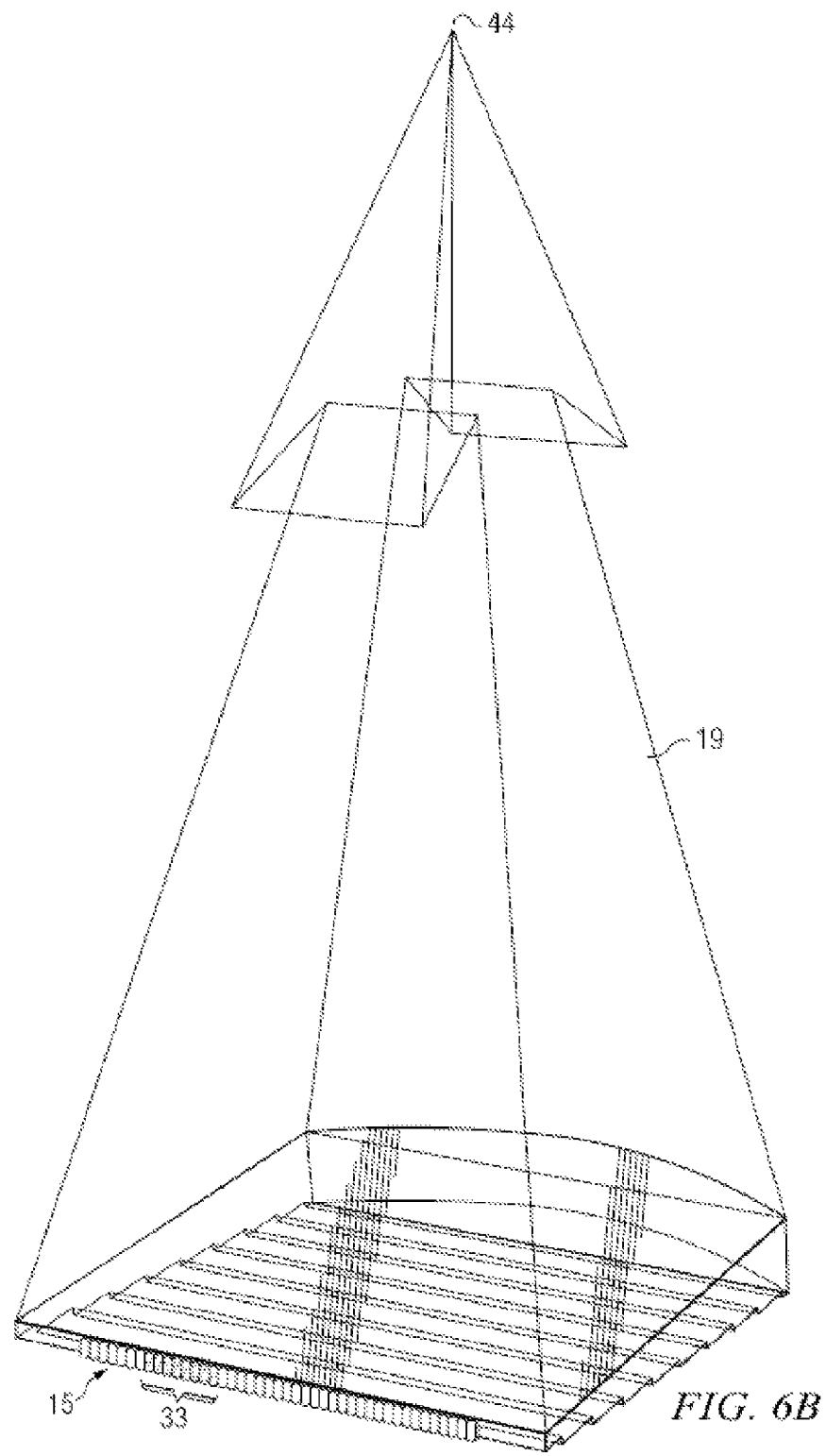
FIG. 6B is a schematic diagram illustrating another embodiment of the generation of a second viewing window in a time multiplexed directional display device in a second time slot, in accordance with the present disclosure.
Figure 6C:
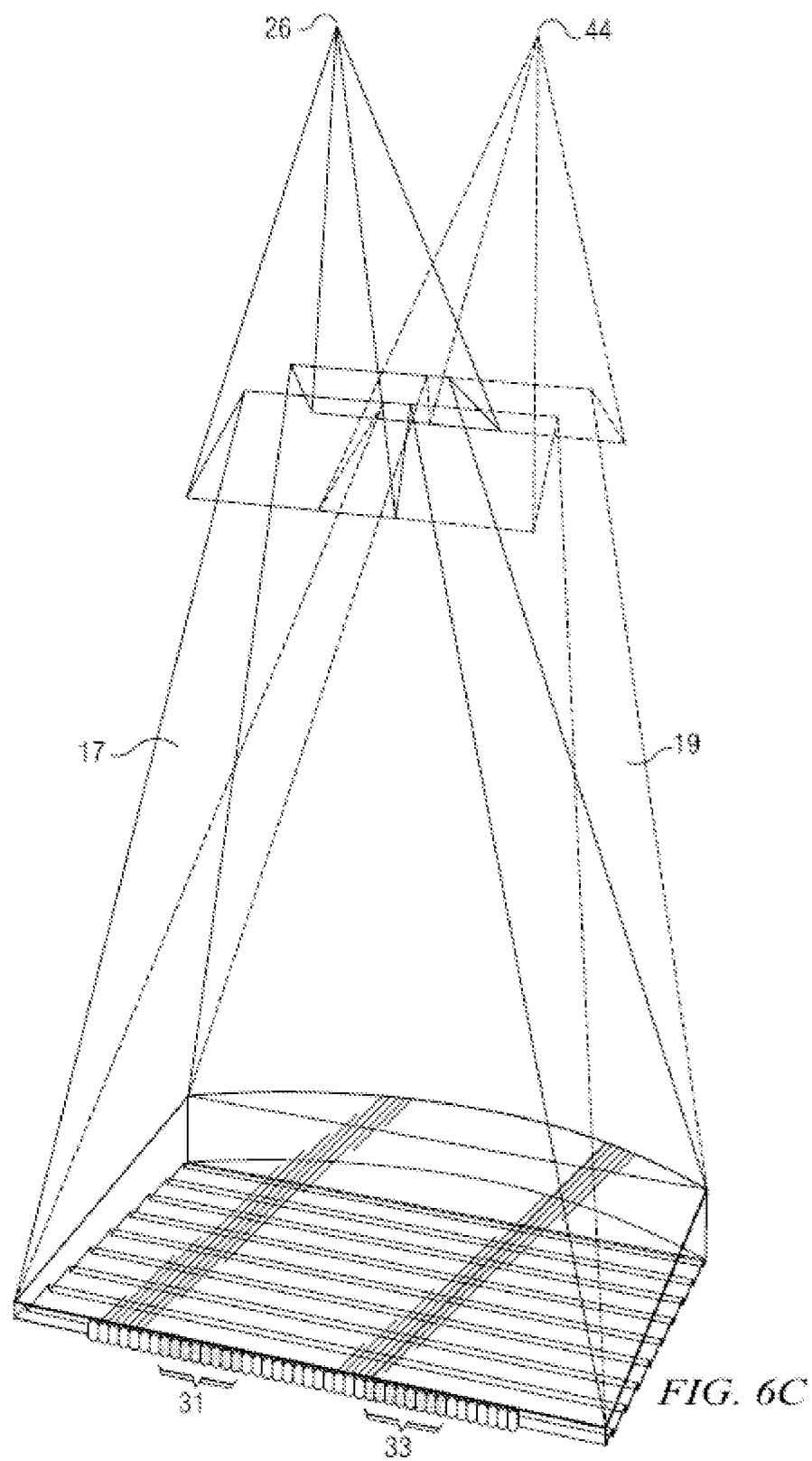
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights and directional display devices described herein. Note that illuminator element groups 31, 33 each include one or more illumination elements from illumination elements 15a to 15n, where n is an integer greater than one.

Figure 7:
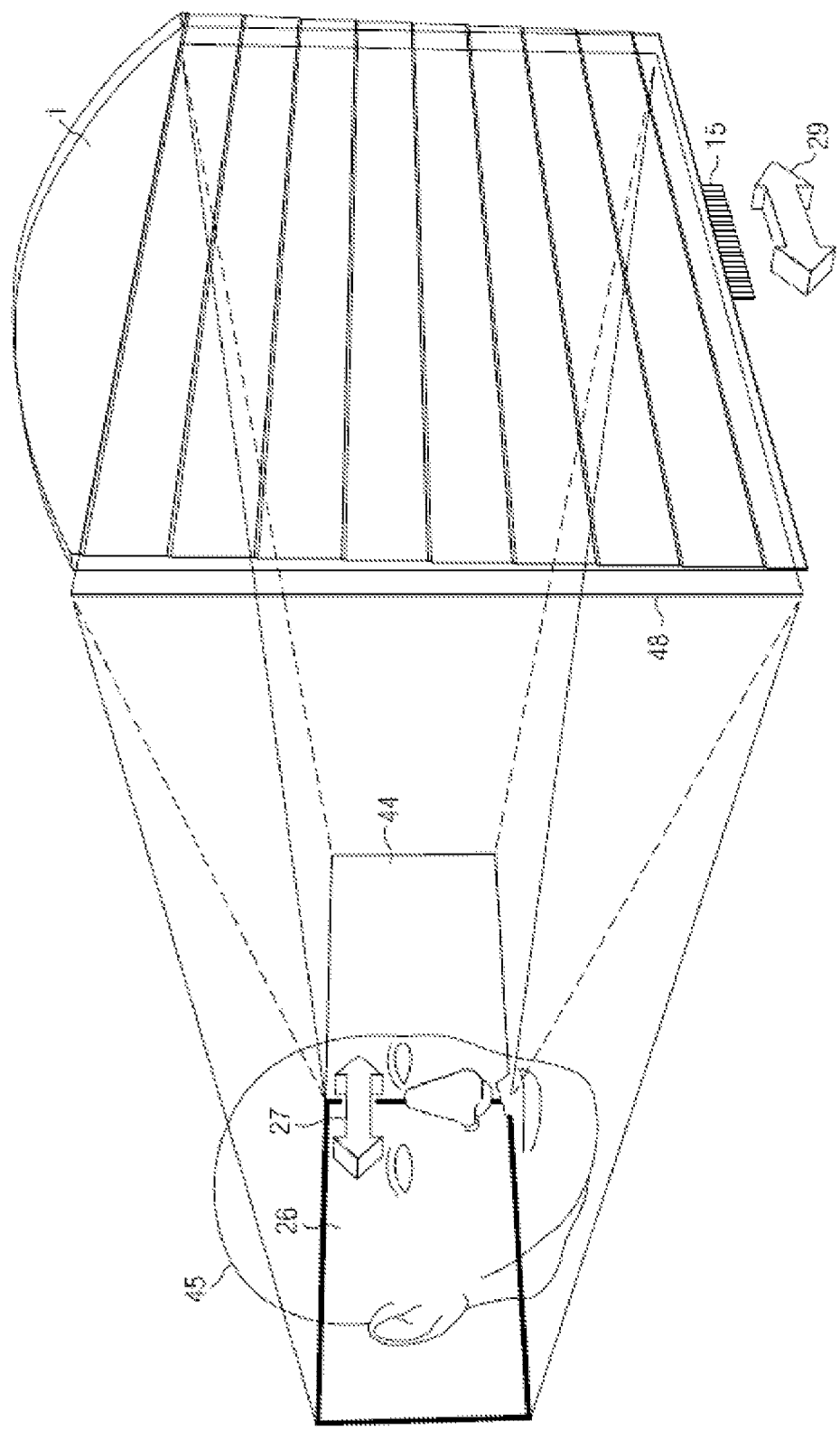
FIG. 7 is a schematic diagram illustrating an observer tracking autostereoscopic display apparatus including a time multiplexed directional display device, in accordance with the present disclosure.

FIG. 7 is a schematic diagram illustrating one embodiment of an observer tracking autostereoscopic directional display device including a time multiplexed directional backlight. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights and directional display devices described herein.

Figure 8:
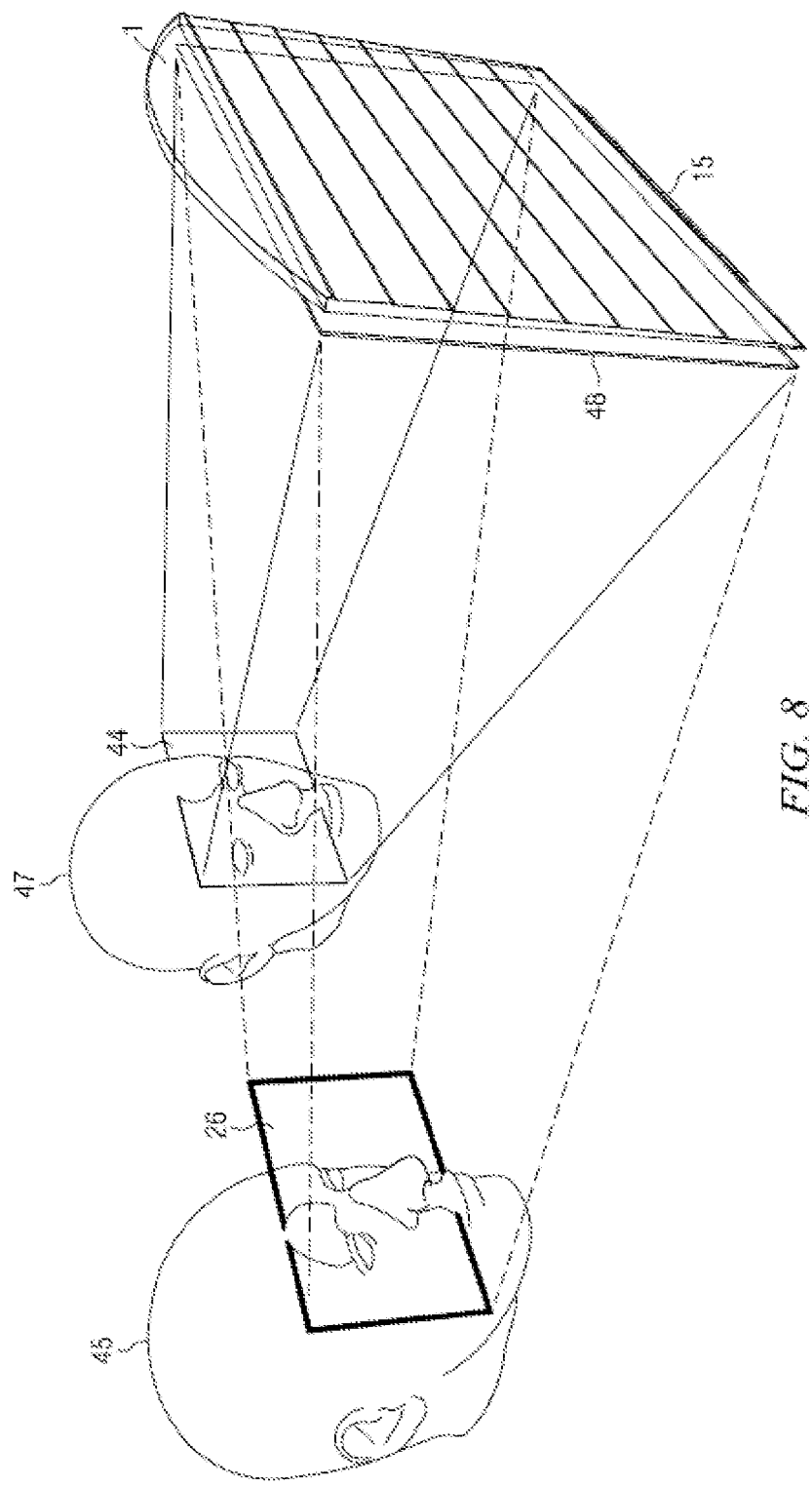
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
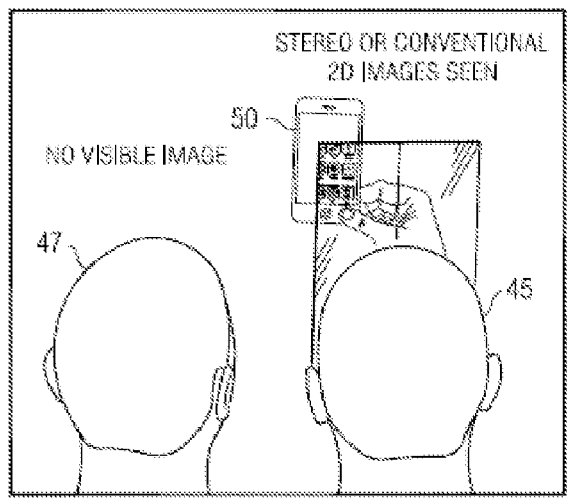
FIG. 9 is a schematic diagram illustrating a privacy directional display device, in accordance with the present disclosure.

FIG. 9 is a schematic diagram illustrating a privacy directional display device which includes an imaging directional backlight apparatus. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
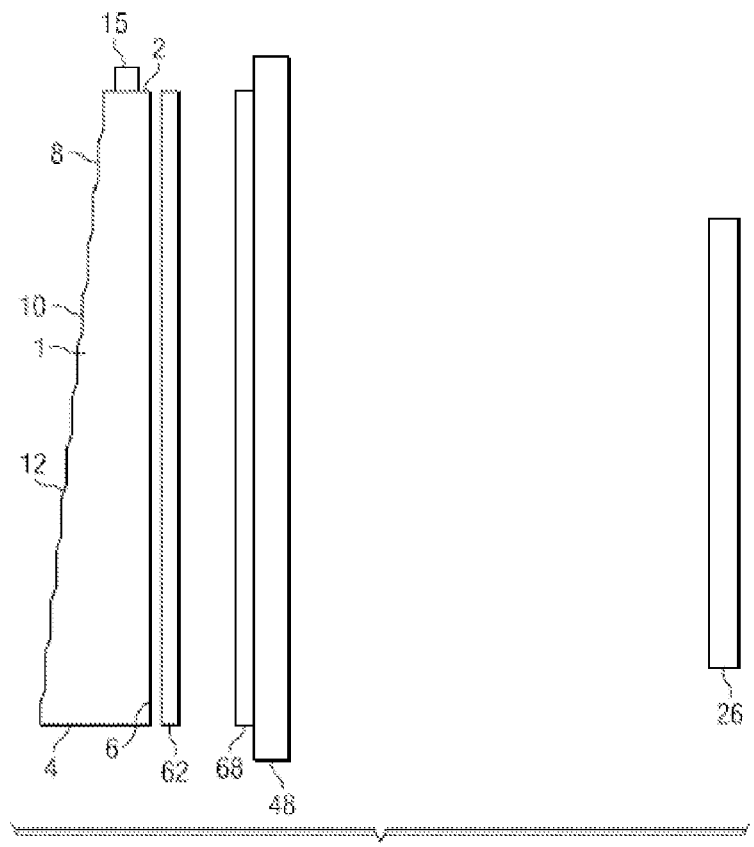
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light generating elements. Additionally in one example, the diffuser may be a wavelength converting phosphor, so that illumination may be at a different wavelength to the visible output light.

Figure 11A:
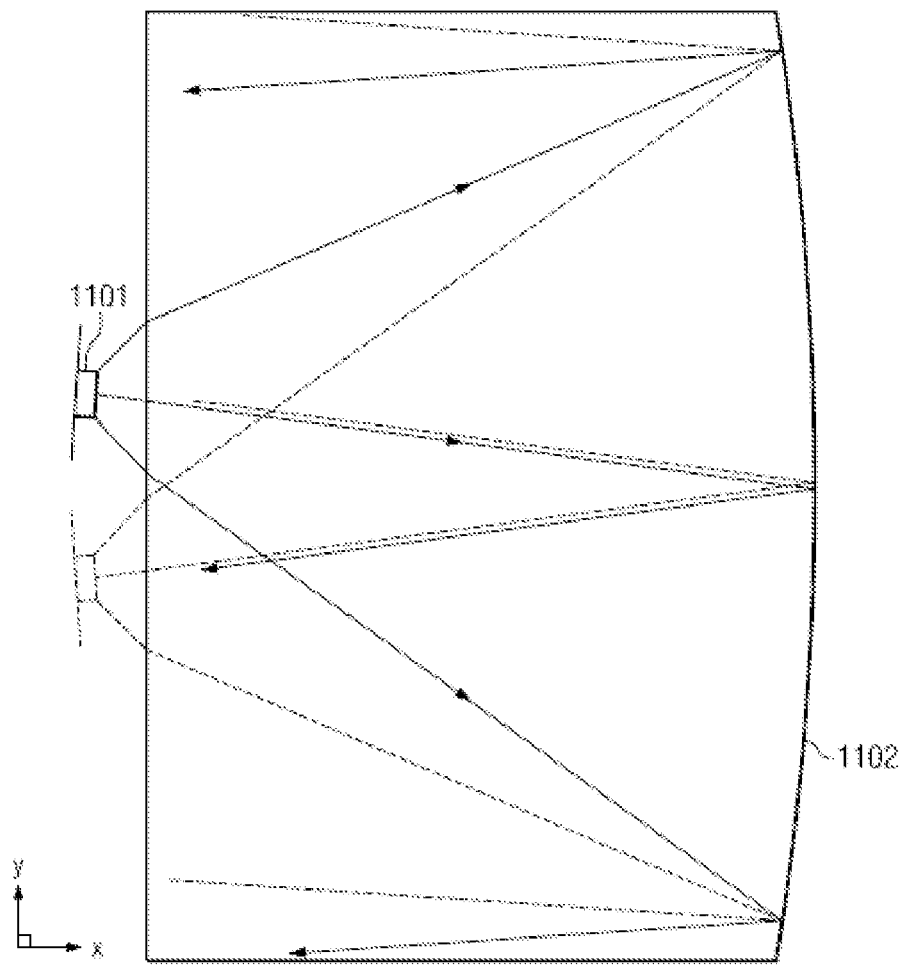
FIG. 11A is a schematic diagram illustrating a front view of a wedge type directional backlight, in accordance with the present disclosure.
Figure 11B:
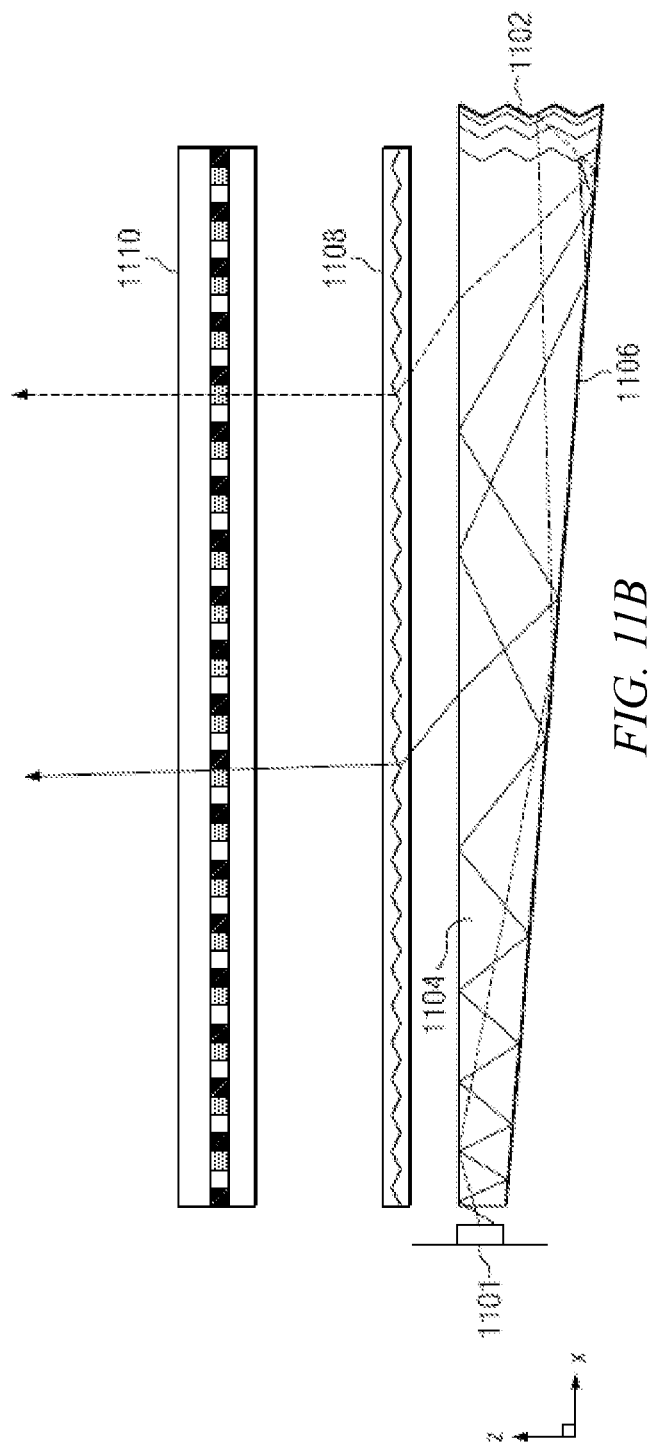
FIG. 11B is a schematic diagram illustrating a side view of a wedge type directional backlight, in accordance with the present disclosure.

FIG. 11A is a schematic diagram illustrating a front view of another imaging directional backlight apparatus, as illustrated, a wedge type directional backlight, and FIG. 11B is a schematic diagram illustrating a side view of the same wedge type directional backlight apparatus. A wedge type directional backlight is generally discussed by U.S. Pat. No. 7,660,047 and entitled "Flat Panel Lens," which is herein incorporated by reference in its entirety. The structure may include a wedge type waveguide 1104 with a bottom surface which may be preferentially coated with a reflecting layer 1106 and with an end corrugated surface 1102, which may also be preferentially coated with a reflecting layer 1106. As shown in FIG. 11B, light may enter the wedge type waveguide 1104 from local sources 1101 and the light may propagate in a first direction before reflecting off the end surface. Light may exit the wedge type waveguide 1104 while on its return path and may illuminate a display panel 1110. By way of comparison with a stepped waveguide, a wedge type waveguide provides extraction by a taper that reduces the incidence angle of propagating light so that when the light is incident at the critical angle on an output surface, it may escape. Escaping light at the critical angle in the wedge type waveguide propagates substantially parallel to the surface until deflected by a redirection layer 1108 such as a prism array. Errors or dust on the wedge type waveguide output surface may change the critical angle, creating stray light and uniformity errors. Further, an imaging directional backlight that uses a mirror to fold the beam path in the wedge type directional backlight may employ a faceted mirror that biases the light cone directions in the wedge type waveguide. Such faceted mirrors are generally complex to fabricate and may result in illumination uniformity errors as well as stray light.

The wedge type waveguide and stepped waveguide further process light beams in different ways. In the wedge type waveguide, light input at an appropriate angle will output at a defined position on a major surface, but light rays will exit at substantially the same angle and substantially parallel to the major surface. By comparison, light input to a stepped waveguide at a certain angle may output from points across the first side, with output angle determined by input angle. Advantageously, the stepped waveguide may not require further light re-direction films to extract light towards an observer and angular non-uniformities of input may not provide non-uniformities across the display surface.

Continuing the discussion of FIG. 10, a vertical diffuser 68 may be arranged to further extend the height of the window 26. The light may then be imaged through the spatial light modulator 48 to an observer at or near to the window 26.

Continuing the discussion of FIG. 10, the stepped waveguide 1 may include an input end 2 which may be thin and a reflective end 4 which may be thicker than the input end 2. In one embodiment the reflective end may have positive optical power. The stepped waveguide 1 may also include a first guide surface 6 and a second guide surface 8. The second guide surface 8 may include extraction features 10 and guiding features 12. The first guide surface 6 may be arranged to guide light by total internal reflection and the second guide surface may have a plurality of light extraction features oriented to reflect light guided through the waveguide in directions allowing exit through the first guide surface as the output light. The light extraction features 10 may be facets of the second guide surface. The second guide surface may include facets and regions alternating with the facets that may be arranged to direct light through the waveguide without substantially extracting it.

In another embodiment, the first guide surface of another waveguide may be arranged to guide light by total internal reflection and the second guide surface may be substantially planar and inclined at an angle to reflect light in directions that break the total internal reflection for outputting light through the first guide surface. The display device may further include a deflection element extending across the first guide surface of the waveguide for deflecting light towards the normal to the spatial light modulator. The reflective end may have positive optical power.

In another embodiment a display device may include a directional backlight and a transmissive spatial light modulator. The transmissive spatial light modulator may be arranged to receive the output light from the directional backlight. The transmissive spatial light modulator may include an array of pixels arranged to modulate light passing therethrough.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

Figure 12:
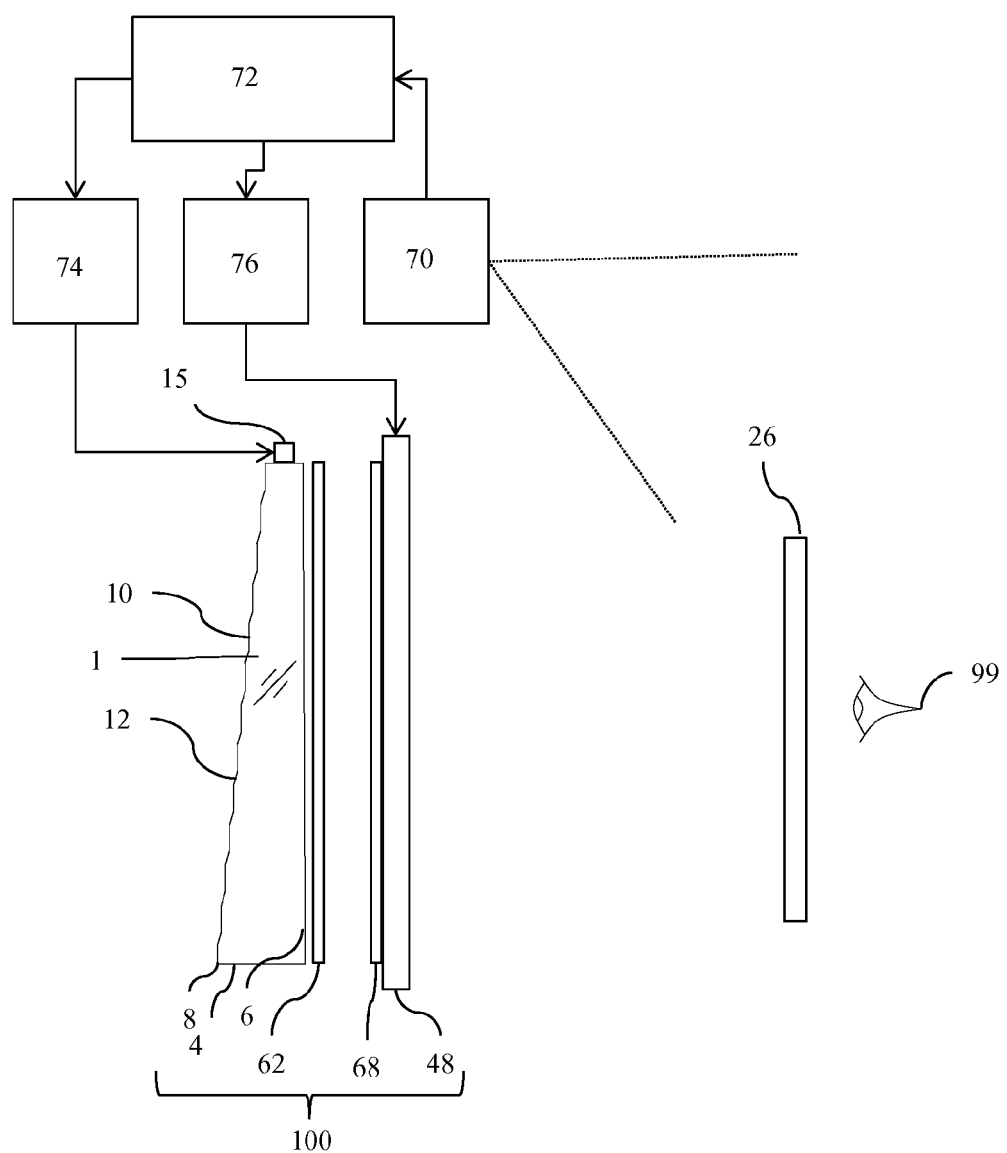
FIG. 12 is a schematic diagram illustrating a directional display apparatus including a display device and a control system, in accordance with the present disclosure.

FIG. 12 is a schematic diagram illustrating a directional display apparatus including a display device 100 and a control system. The arrangement and operation of the control system will now be described and may be applied, with changes as necessary, to each of the display devices disclosed herein.

The waveguide 1 is arranged as described above. The reflective end 4 converges the reflected light. A Fresnel lens 62 may be arranged to cooperate with reflective end 4 to achieve viewing windows 26 at a viewing plane 106 observed by an observer 99. A transmissive spatial light modulator (SLM) 48 may be arranged to receive the light from the directional backlight. Further a diffuser 68 may be provided to substantially remove Moire beating between the waveguide 1 and pixels of the SLM 48 as well as the Fresnel lens 62.

The control system may include a sensor system arranged to detect the position of the observer 99 relative to the display device 100. The sensor system includes a position sensor 70, such as a camera, and a head position measurement system 72 that may for example include a computer vision image processing system. The control system may further include an illumination controller 74 and an image controller 76 that are both supplied with the detected position of the observer supplied from the head position measurement system 72.

The illumination controller 74 selectively operates the illuminator elements 15 to direct light to into the viewing windows 26 in cooperation with waveguide 1. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 76 controls the SLM 48 to display images. To provide an autostereoscopic display, the image controller 76 and the illumination controller 74 may operate as follows. The image controller 76 controls the SLM 48 to display temporally multiplexed left and right eye images. The illumination controller 74 operate the light sources 15 to direct light into viewing windows in positions corresponding to the left and right eyes of an observer synchronously with the display of left and right eye images. In this manner, an autostereoscopic effect is achieved using a time division multiplexing technique.

Figure 13:
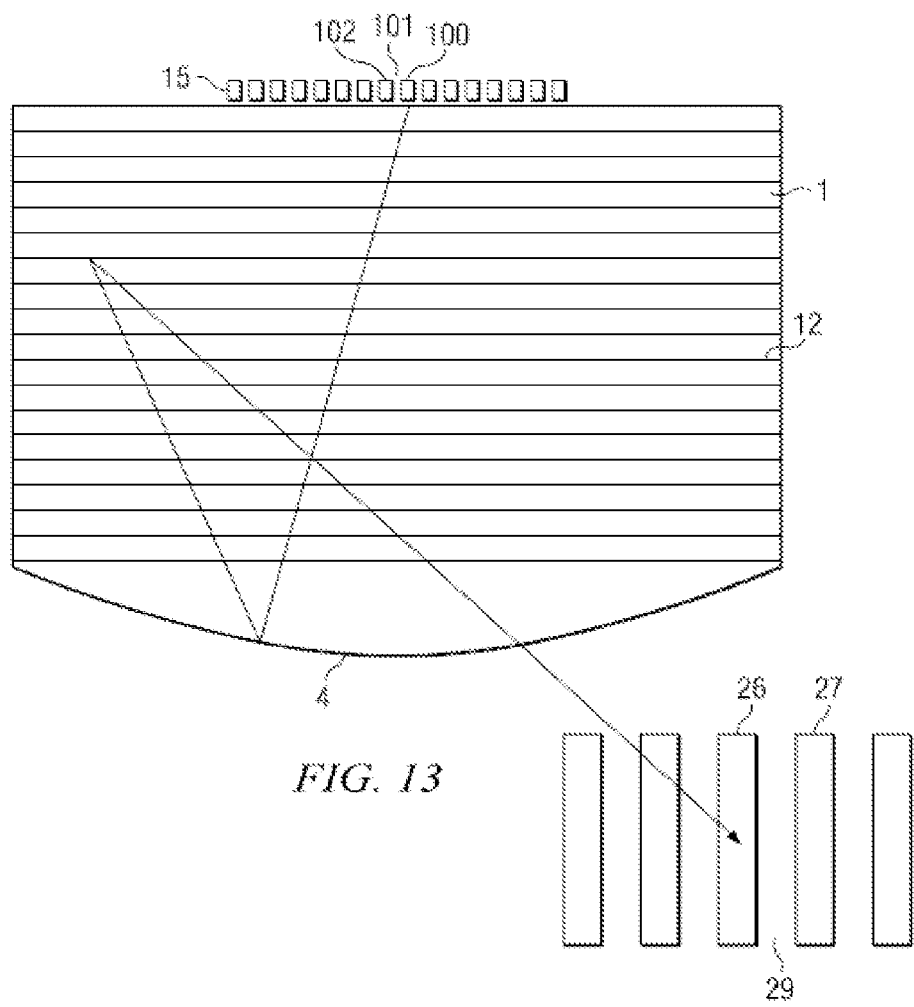
FIG. 13 is a schematic diagram illustrating generation of viewing windows from a discontinuous array of illuminator elements, in accordance with the present disclosure.

FIG. 13 is a schematic diagram illustrating generation of viewing windows from a discontinuous array of illuminator elements. Further, FIG. 13 shows the imaging of a illuminator element array 15 including, for example, discrete illuminator elements 100,102 which may be separated by gap 101. Light propagating through the stepped waveguide 1 that is imaged by mirror on surface 4 and light extraction features 12 may be imaged towards a set of windows with window 26 being an image of illuminator 100 and window 27 being an image of illuminator 27. Gap 101 may be effectively imaged to a gap 29. In this embodiment, the imaging function of the light guide may be substantially one dimensional, so the vertical height of the illuminators may be extended. In operation gaps 29 may provide image flicker and non-uniform display intensity for an observer and are thus undesirable.

Figure 14:
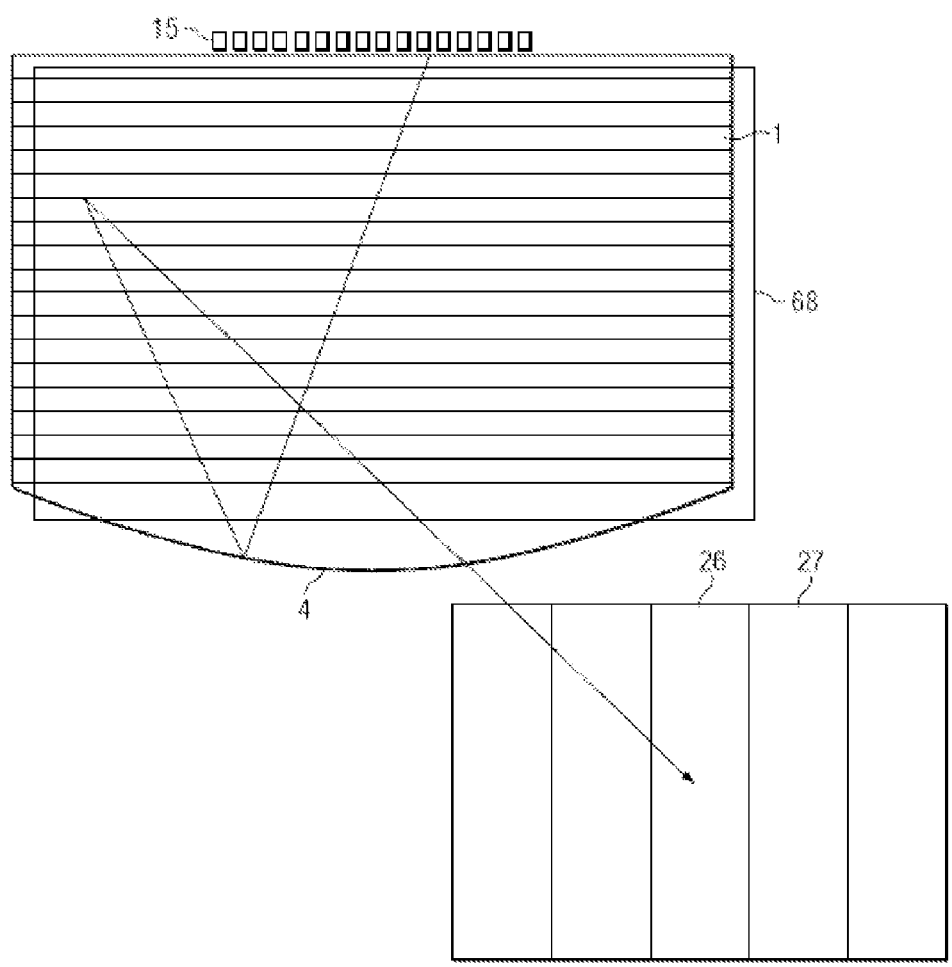
FIG. 14 is a schematic diagram illustrating generation of viewing windows from a discontinuous array of illuminator elements, in accordance with the present disclosure.

FIG. 14 is a schematic diagram illustrating generation of viewing windows from a discontinuous array of illuminator elements. Further, FIG. 14 shows that a diffuser 68 may be arranged so that the width of the windows 26, 27 is increased and gap 29 (as shown in FIG. 14) reduced. Typically in an approximately 17" screen diagonal size display viewed from an approximate distance of 500 mm, the diffuser 68 may be an asymmetric diffuser with, for example, a diffusion angle of approximately 30 degrees in the vertical direction and approximately 3 degrees in the horizontal direction. For large displays of approximate size 40" screen diagonal size viewed from an approximate distance of 3 m, the diffuser may achieve a smaller lateral diffusion angle, for example, approximately 1 degree to reduce cross talk leakage between adjacent eyes. Advantageously, an asymmetric diffuser may be used to provide blurring between images of the illuminator elements in the window plane arising from discrete illuminator elements, while maintaining low cross talk.

Figure 15:
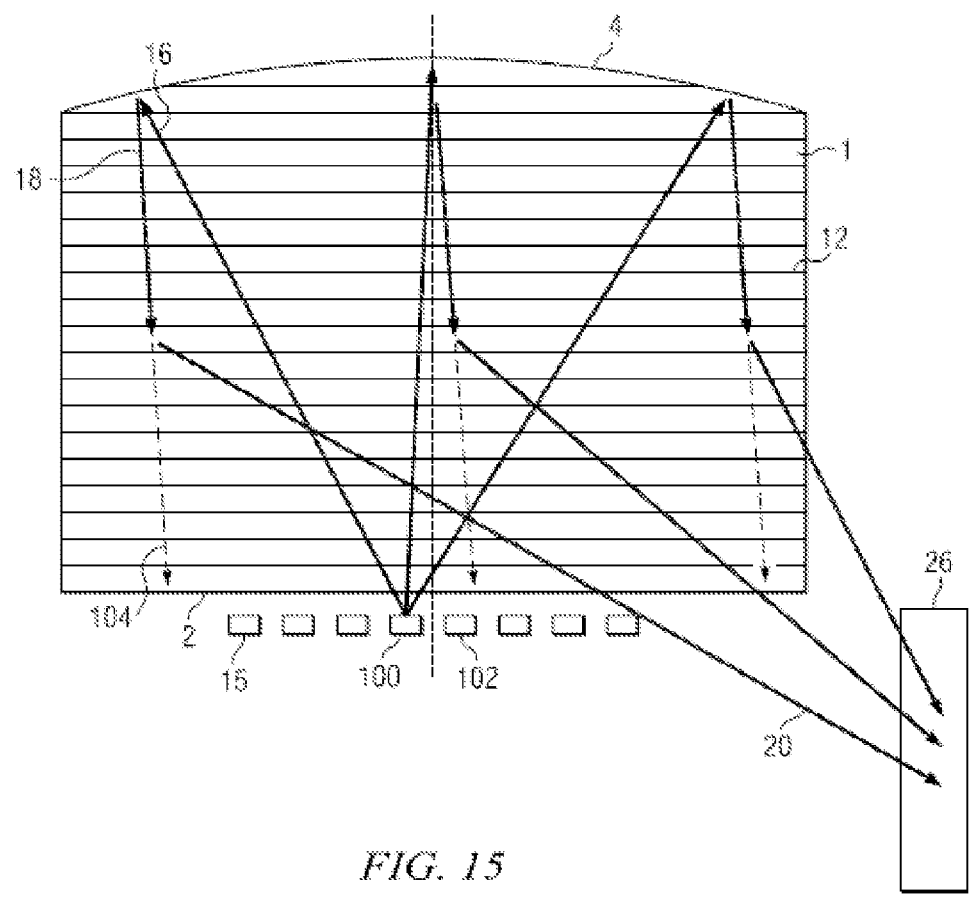
FIG. 15 is a schematic diagram illustrating an origin of stray light in a waveguide, in accordance with the present disclosure.

FIG. 15 is a schematic diagram illustrating an origin of stray light in a waveguide 1. Further, FIG. 15 shows illumination by a directional backlight of a viewing window 26 as described in FIG. 5. However, stray light rays 104 that may not be incident on light extraction features 12 during propagation in the stepped waveguide after incidence on mirror surface 4 may be incident onto surface 2. In other words, the individual illuminator elements 100, 102 of the illuminator array 15 may return a certain proportion of light to the input end 2.

Figure 16:
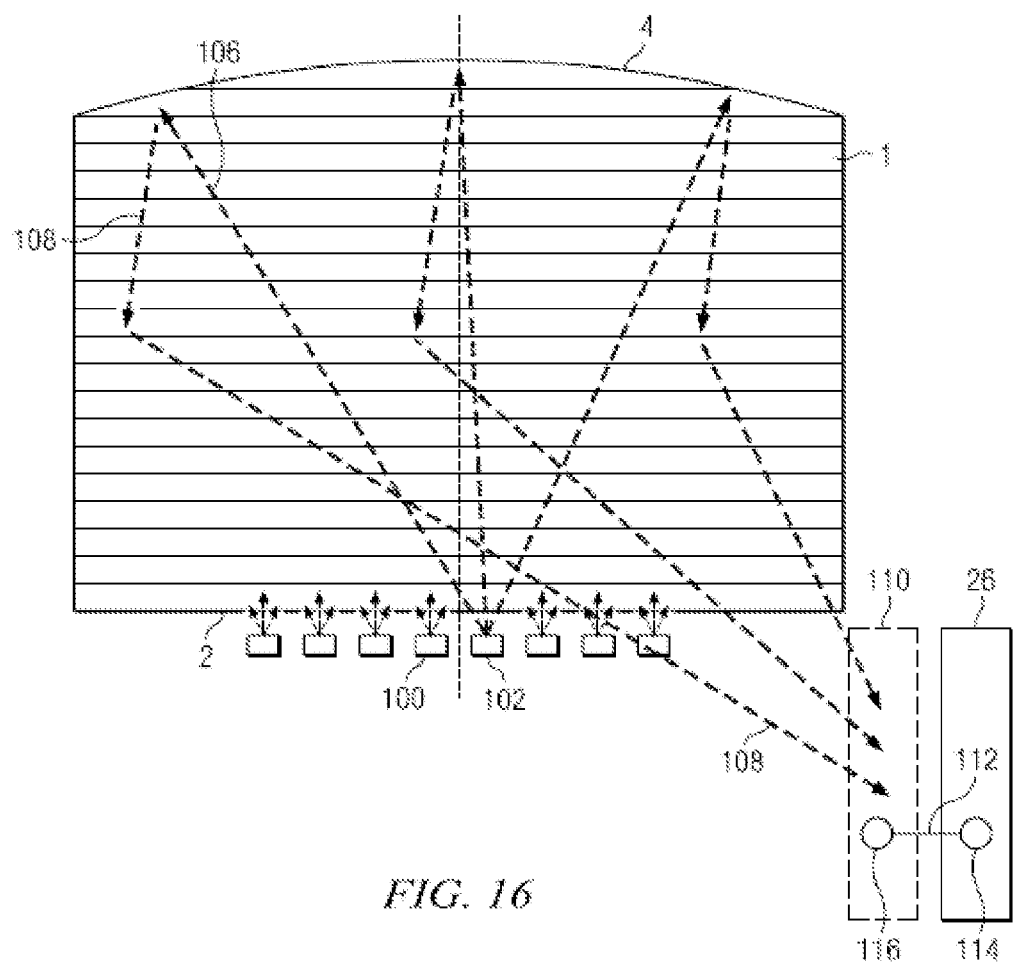
FIG. 16 is a schematic diagram illustrating generation of secondary viewing windows from stray light in a waveguide, in accordance with the present disclosure.

FIG. 16 is a schematic diagram illustrating generation of secondary viewing windows from stray light in a waveguide 1. Further, FIG. 16 shows the propagation of the stray light rays 104 after incidence on surface 2. Light rays 104 that were directed from illuminator element 100 thus may fall onto the illuminator element 102. The structure of illuminator element 102 may reflect light in a diffuse manner back into the stepped waveguide 1 as shown for example by ray 106. After reflection at mirror surface 4, light ray 108 may be incident on a light extraction feature 12 of the stepped waveguide 1 and be extracted towards the window plane. As the light was imaged from position of illuminator element 102, it may be directed to a stray light window 110. Thus light that was intended for illumination of window 26 may become incident on a different window 110. If the illuminator element 100 corresponds to a right eye 114 illumination and illuminator element 102 corresponds to a left eye 116 illumination then such a process may image right eye data into the left eye 116 of an observer 112, creating undesirable cross-talk that degrades 3D autostereoscopic image quality.

Figure 17:
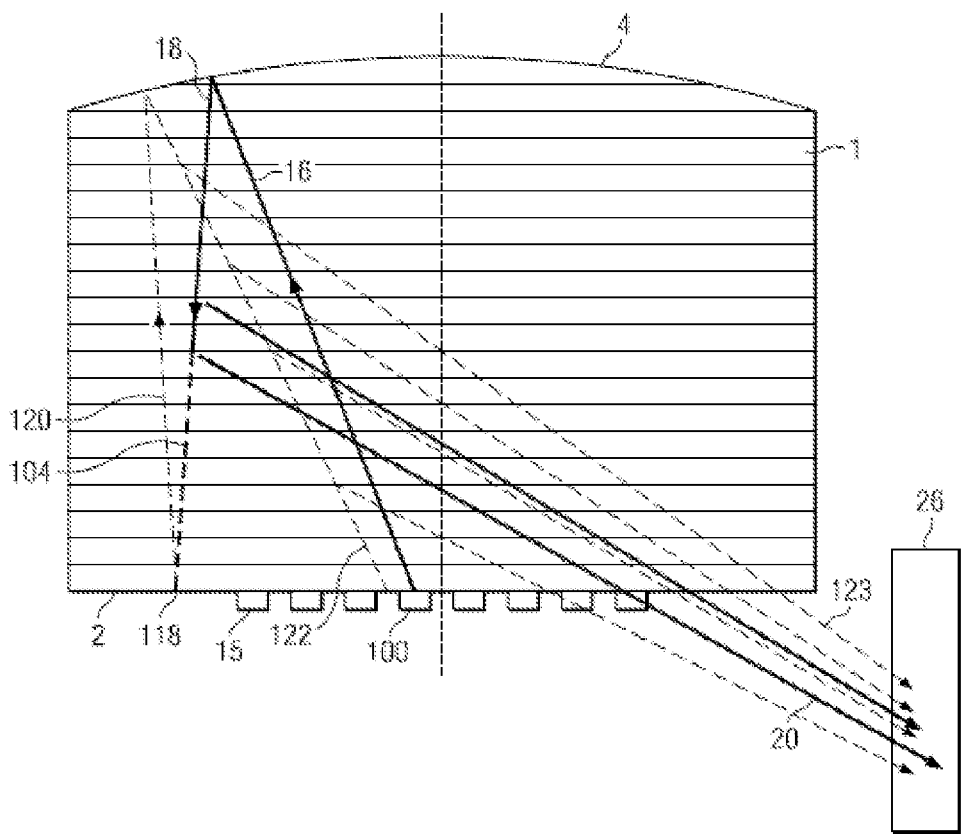
FIG. 17 is a schematic diagram illustrating a further illumination artifact arising from stray light in a waveguide, in accordance with the present disclosure.

In addition to reflection from the illuminator elements of the illuminator array 15 of FIG. 17, light may also be reflected in a specular manner by the input end 2, when surface of the input end 2 is substantially flat as illustrated in FIG. 17. FIG. 17 is a schematic diagram illustrating a further illumination artifact arising from stray light in a waveguide 1. Light rays 104 may be specularly reflected at surface 2 to provide rays 120. The rays 120 may be reflected at surface 4 to provide rays 122. Such a '4 pass' artifact may result in extraction at features 12 along rays 123 towards window 26 such that ray 122 may be seen as a single line on the display surface for an observer in window 26 when illuminated by a illuminator element 100. It would thus be desirable to remove stray light rays 122, and thus output rays 123, to reduce the 4-pass artifact. Additionally, it may be desirable to reduce the visibility of image cross talk and 4-pass artifacts, thus increasing the performance of the display.

Figure 18:
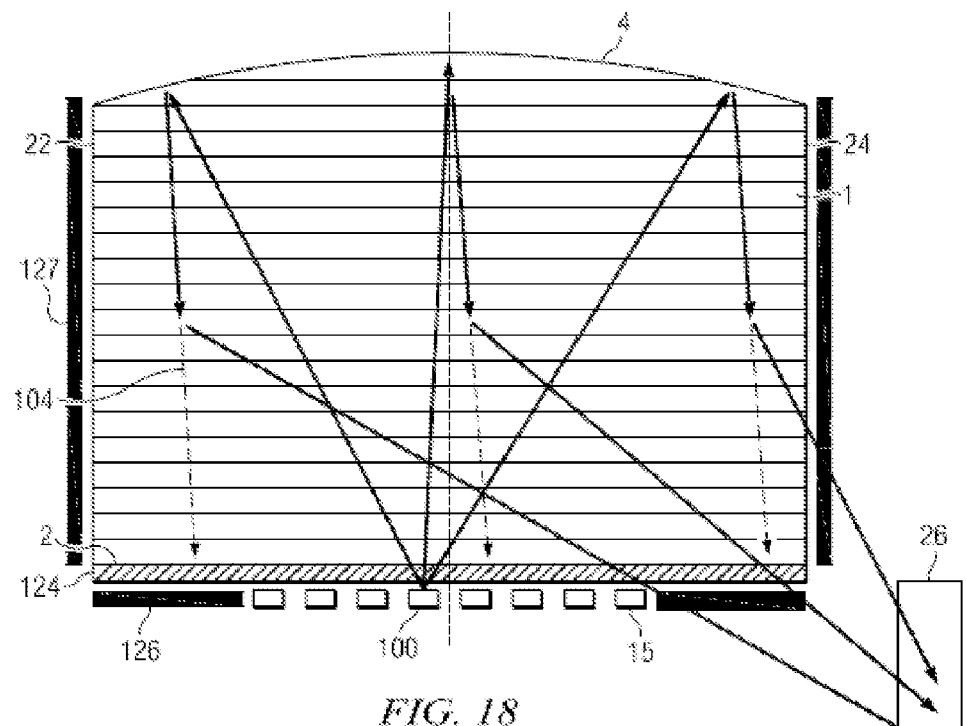
FIG. 18 is a schematic diagram illustrating a directional backlight arranged to reduce stray light propagation, in accordance with the present disclosure.

FIG. 18 is a schematic diagram illustrating a directional backlight arranged to reduce stray light propagation. Further, FIG. 18 shows an embodiment of a directional backlight including a waveguide 1 arranged as described above but with a low reflectivity input end 2.

Stepped waveguide 1 may include a low reflection layer 124 that may be arranged at the surface of the input end 2, for example, by means of bonding with an adhesive. The low reflection layer 124 acts as a reflection reduction element arranged to reduce reflections of light incident on the input end 2 after reflection from the reflective end 4. The layer 124 may include at least one reflection reducing element as will be described, for example, in FIG. 19 below. The low reflection layer 124 extends across the entirety of the input end 2.

In addition, light absorbing elements 126 may be arranged to absorb light rays 104 from the valve. The light absorbing elements 126 further act as a reflection reduction element arranged to reduce reflections of light incident on the input end 2 after reflection from the reflective end 4 and may include a light absorptive layer. The light absorbing elements 126 may extend across part of the input end 2 of the waveguide 1, outside of the illuminator elements 100. As illustrated in FIG. 18, the light rays 104 may originate from an illuminator element 100 of the illuminator array 115. The light absorbing elements 126 may include for example a black absorbing layer arranged in the regions not occupied by the illuminator elements 100 of the illuminator array 15. By absorbing stray light incident on the input end 2, the light absorbing elements 126 reduce artifacts of the type described above with reference to FIG. 17.

Further light absorbing elements 127 may be arranged along the surfaces or sides 22, 24 of the waveguide 1 to absorb incident stray light. Absorbing elements 126, 127 may be, for example, dyes, pigments contained in paints, adhesive films, and so forth.

In the present disclosure an optical window refers to the image of a single light source in the window plane. By way of comparison, a viewing window 26 is the region in the window plane wherein light is provided including image data of substantially the same image from across the display area. Thus a viewing window 26 may be formed from multiple optical windows.

Figure 19:
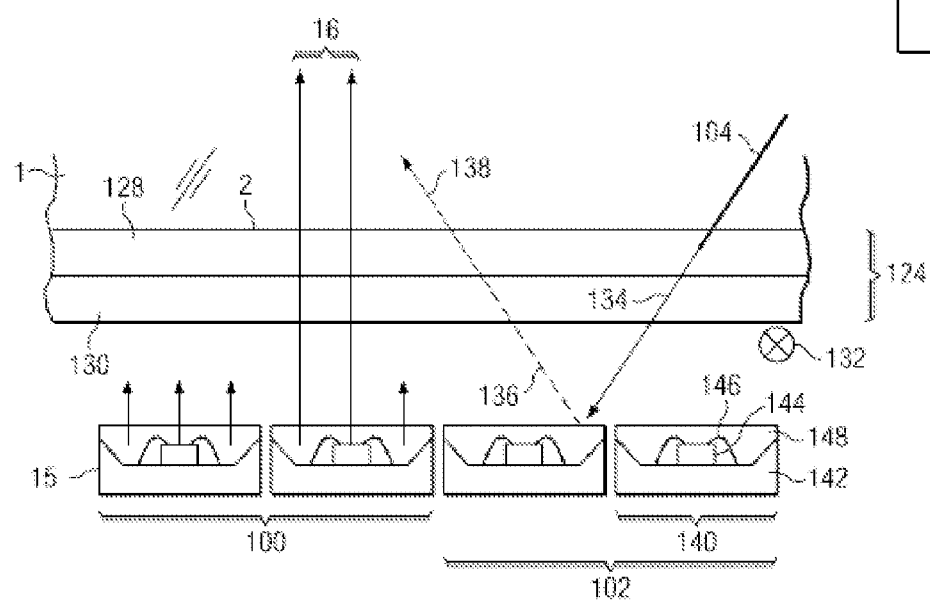
FIG. 19 is a schematic diagram illustrating one embodiment of a directional backlight incorporating a stray light reduction arrangement, in accordance with the present disclosure.

FIG. 19 is a schematic diagram illustrating one embodiment of a directional backlight including a stray light reduction arrangement. Further, FIG. 19 shows a detail of an example of low reflection layers 124. The directional backlight includes a waveguide 1 arranged as described above but with a low reflectivity input end 2. In particular, the waveguide 1 may include a low reflection layer 124 as described above with reference to FIG. 18. The low reflection layer 124 acts as a reflection reduction element and is arranged to reduce reflections of light incident on the input end after reflection from the reflective end, and is arranged as follows.

The waveguide 1 of FIG. 19 may include an input end 2 which may be operable to receive light from the illumination array 15. The low reflection layer 124 may be located between the input end 2 and the illumination array 15. Input light rays 16 may be provided by illuminator elements 100 of the illuminator array 15. There will now be described the arrangement of the illuminator elements 100 which may be applied in any of the directional backlights and directional display devices described herein.

Figure 21:
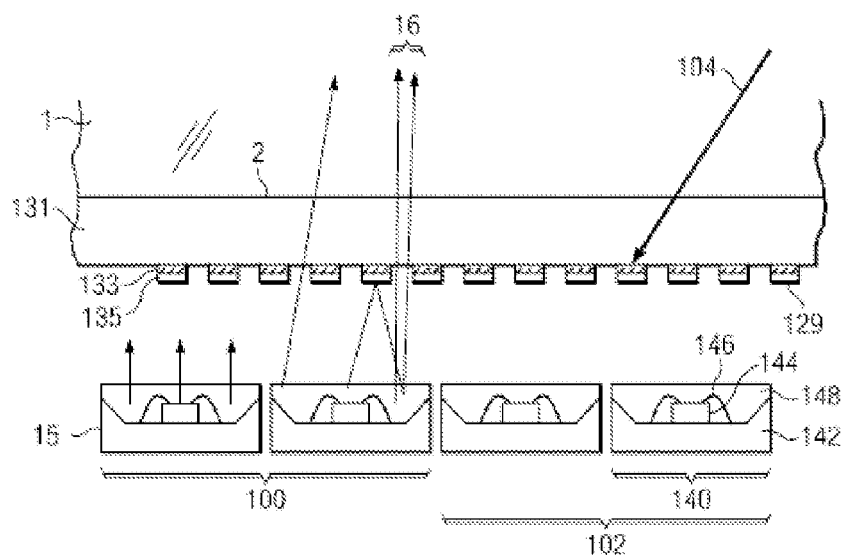
FIG. 21 is a schematic diagram illustrating a detail of a further directional backlight incorporating a stray light reduction arrangement, in accordance with the present disclosure.

Illuminator elements 100 of the illuminator array 15 may include multiple illuminator elements 140. As illustrated in FIG. 21, adjacent elements 140 may be used as a single illuminator element 102. In one example, the elements 140 may be LEDs (light emitting diodes). Illuminator elements 140 may include at least a package body 142, an emitting chip 144 and wire bonds 146, and phosphor 148. The package body 142 acts as a substrate and the emitting chip 144 and the phosphor 148 are supported thereon.

Figure 23:
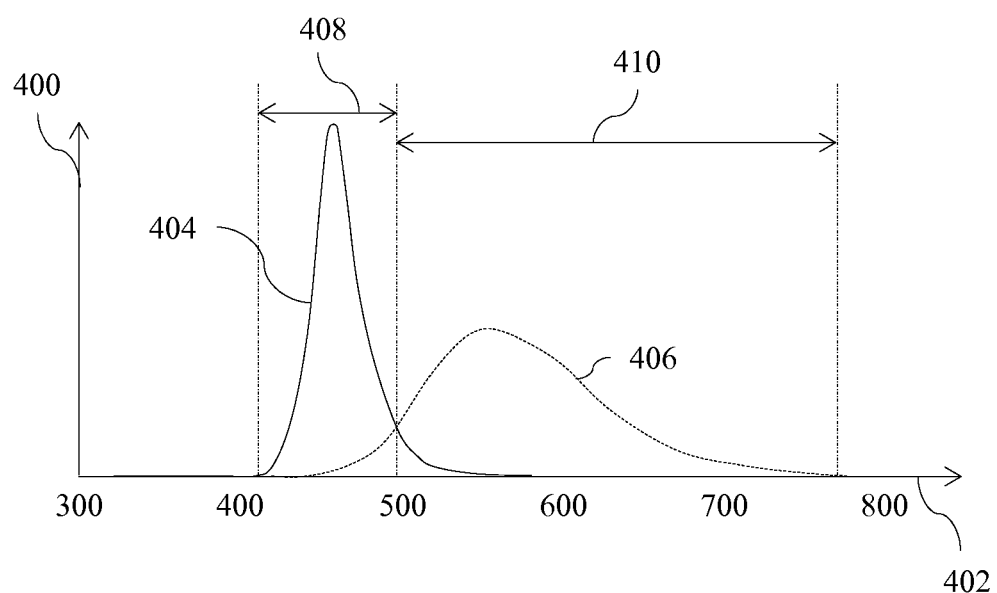
FIG. 23 is a schematic diagram illustrating a graph of a white light source spectral distribution, in accordance with the present disclosure.

The emitting chip 144 may act as a light generation element which is arranged to generate light in an emission band, for example blue light. The phosphor 148 acts a wavelength conversion material which is arranged to convert light in the emission band generated by the light generation element into light in a conversion band, for example yellow light. In one example, the emitting chip 144 may be a semiconductor diode FIG. 23 is a schematic diagram illustrating a graph of a typical white spectral distribution of a light source, that might be that of an illuminator element 140 or any of the light sources described herein. Output radiance 400 is plotted against wavelength in nanometers for an illustrative light source including an emission band including the distribution 404 and conversion band including the distribution 406. The emission band may alternatively be considered to be the spectral region 408 and the conversion band may be considered to be the spectral region 410. Thus an array 15 of light sources may be arranged to output light predominantly in an emission band and in a conversion band. Advantageously such sources may achieve high output luminous efficiency with white points and spectral distributions for illumination of spatial light modulators 48 to achieve desirable color characteristics of displayed images.

Continuing the discussion of FIG. 19, the low reflection layer 124 may include a layer 128 which is a filter. The layer 128 is disposed between the input end 2 and the illuminator elements 100, although in this example the layer 128 further extends across the entirety of the input end 2. Incident stray light 104 is incident on the layer 128 which may be an absorption color filter which may be arranged to absorb light in the conversion band preferentially over light in the emission band. In that case the layer 128 preferentially transmits a greater portion of light in the emission band than light in the conversion band.

Figure 20:
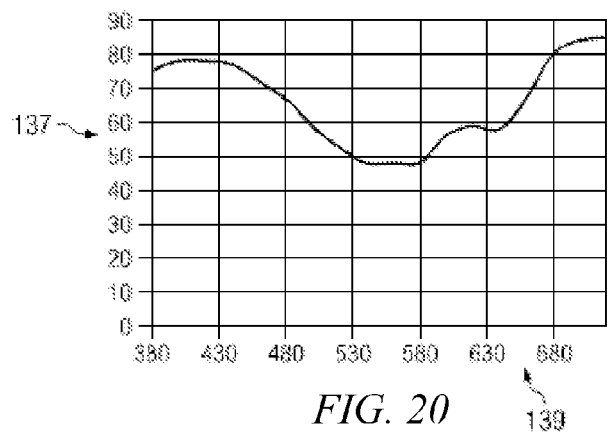
FIG. 20 is a schematic diagram illustrating the transmission spectrum of one example of a color absorption filter used in the directional backlight of FIG. 19, in accordance with the present disclosure.

For example, layer 128 may include color filters such as 'Surprise Pink' supplied by Roscoe Laboratories Inc. 1265 Los Angeles Street, Glendale, Calif., USA, 91204, with a percentage transmission 137 as shown as a function of incident wavelength 139 by FIG. 20. Color filter 128 may additionally or alternatively include at least one quantum dot material. Advantageously quantum dots can achieve optical properties that are determined from their physical size rather than chemical make-up so that absorption bands can be controlled by means of modifying the physical size of the light absorbing particles. Such particles may be arranged in a layer with a substantially transparent binding material.

The low reflection layer 124 may further include a secondary layer 130 which may be a film with an anti-reflection coating 132.

FIG. 20 is a schematic diagram illustrating the transmission spectrum of one example of a color absorption filter used in the low reflection layer 124 of FIG. 19. The low reflection layer 124 may be arranged as one or more films that may be attached to the surface of the input end 2 of the stepped waveguide 1 by means of pressure sensitive adhesive layers or by other known attachment methods.

On incidence with layer 128, light ray 104 may be partially absorbed in the color filter. This light may be incident on the phosphor 148 of an illuminator element 140 arranged as described above. A portion of incident light in the emission band in ray 134 may be absorbed by the phosphor 148 so that light rays 136 may be scattered by the phosphor and reflected by the package body 142 and the emitting chip 144. Thus the reflected light ray 136 from the element 140 may have a color that has a lower intensity in the emission band than the incident light ray 134. Light ray 136 is one example of a typically diffuse light cone. On incidence with the layer 128, light ray 136 may be preferentially absorbed in the conversion band of the spectrum. Stated differently, the ray 136 may have a greater intensity in the conversion band than light ray 104, thus the reflection may be preferentially absorbed.

Continuing the discussion of FIGS. 19 and 20, light rays may be directly emitted from the chip 144 and may undergo a single pass through the filter 128, whereas the stray light 104 may undergo a double pass to provide ray 138 with a substantially reduced relative intensity. Thus while the filter of layer 128 may degrade overall efficiency, advantageously it may increase the color temperature of illumination of light rays 16 from the emitting chip 144 and phosphor 148. Illumination of color filter LCD panels may typically benefit from a high color temperature, as advantageously a greater color gamut may be produced.

In an alternative embodiment, layer 128 may be a grey absorbing filter with an approximate transmission of 80%, so that the stray light 104 may undergo a double pass, thus giving an approximately 64% transmission. Additionally, the input light 16 may undergo a single pass, with an approximately 80% transmission, thus reducing the visibility of the stray light.

Layer 132 may provide a low reflectivity interface between the stepped waveguide and air which may be provided by dielectric coatings or other known anti-reflection coatings such as moth-eye surfaces. Advantageously, the elements 140 may be arranged in air so that the Lambertian light cone in air may be reduced to an angle of twice the critical angle in the material of the stepped waveguide. Advantageously such an arrangement may be provided to achieve efficient illumination of the mirror surface 4. Further, such an arrangement may reduce the amount of stray light that may be incident on to the sides 22, 24 of the stepped waveguide, thus reducing the total amount of stray light in the system. Advantageously the present embodiments may reduce image cross talk and may reduce the visibility of stray light artifacts while achieving efficient illumination of the mirror surface 4.

FIG. 21 is a schematic diagram illustrating a detail of a further directional backlight including a stray light reduction arrangement that may be used in place of, in addition to, and/or in combination with layer 124 of FIG. 19.

In FIG. 21 a substrate 131 may be arranged with an array of light modulating structures 129 that act as a reflection reduction element arranged to reduce reflections of light incident on the input end 2 after reflection from the reflective end 4. In one example, the substrate 131 may be the layer 128 of FIG. 19.

Returning to the discussion of FIG. 21, each light modulating structure 129 covers part of the area of the illuminator element 140 which is arranged as described above. In this example, each respective illuminator element has plural light modulating structure 129 covering part of its area with gaps in between, but in general each respective illuminator element has plural light modulating structure 129 may have any number of one or more light modulating structures 129 covering part of its area.

Each light modulating structure 129 may include a light absorbing layer 133 and a light reflecting layer 135. The light absorbing layer 133 faces the waveguide 1 and the light reflecting layer 135 faces the illuminator element 140. Incident stray light 104 may be absorbed on the absorbing layer 133 while light that is emitted by illuminator elements 144 of the illuminator array 15 may be transmitted through gaps between the light modulating structures 129. Due to the absorption by the absorbing layer 133, the light modulating structures 129 act as light absorbing elements that absorb light after reflection from the reflective end 4.

Light that is incident on the layer 135 of light modulating structures 129 may be substantially reflected back towards the illuminator elements 144 and the light may be substantially reflected and/or scattered back towards the gaps between the light modulating structures 129, for output into the stepped waveguide 1. Advantageously such an arrangement may achieve reduction in stray light reflection into the stepped waveguide 1 by means of absorption at layer 133, while achieving high output efficiency due to recycling of light by the reflective layer 135.

Figure 22:
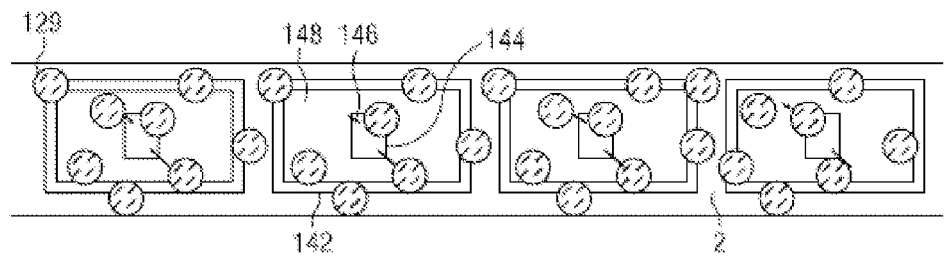
FIG. 22 is a schematic diagram illustrating an end view of the directional backlight of FIG. 21, in accordance with the present disclosure.

FIG. 22 is a schematic diagram illustrating an end view of the directional backlight of FIG. 21 illustrating the coverage of the light modulating elements 129 over the illuminator element 140. Light modulating elements 129 may be arranged with respect to the illuminator elements to improve output uniformity across the illuminator array 15 of illuminator elements. Thus, the reflectors may be positioned near the chip 144 and may be arranged to reflect light in the emission band more widely onto the phosphor 148. Further, some controlled mixing may be achieved between adjacent illuminator elements, while reducing stray light reflection. Advantageously the window plane uniformity may be improved, and the color variation across the window plane may be reduced. Light control elements may be formed, for example, by selective etching of a mirror which may include a first absorbing layer 133 and a reflective layer 135. Alternatively, reflective and absorbing inks may be printed in approximate registration onto a substrate. The reflective layer 135 may be metallic, for example, or may be a diffuse white reflective layer.

Figure 24:
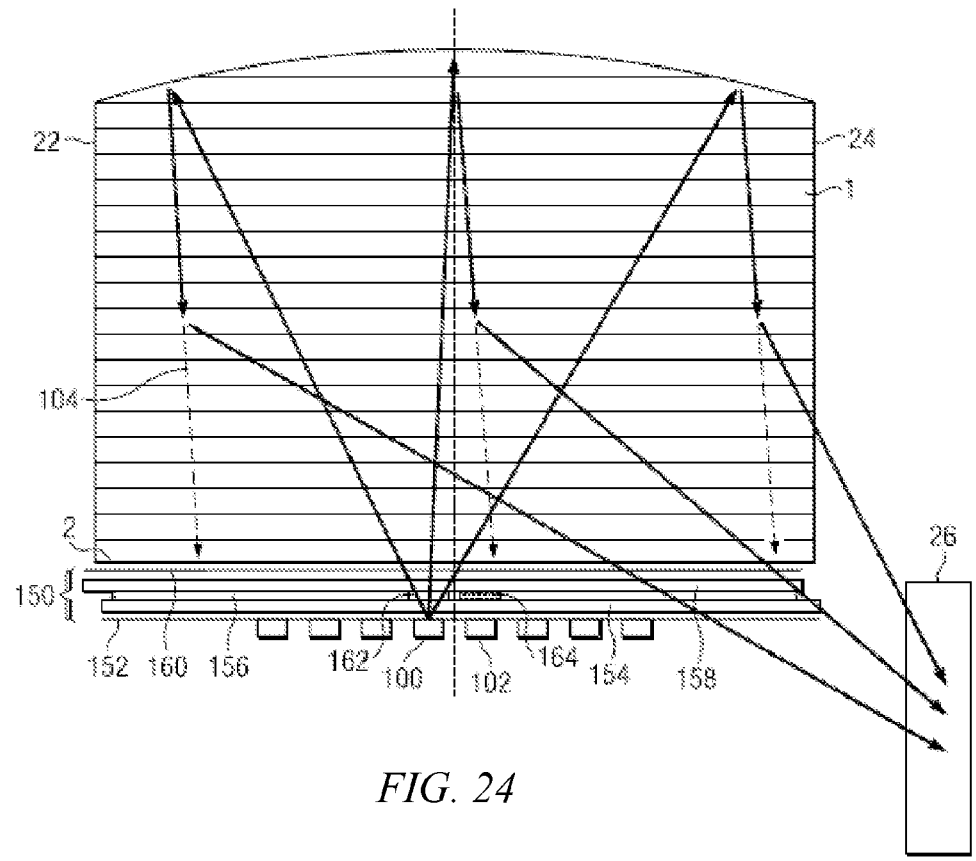
FIG. 24 is a schematic diagram illustrating a further directional backlight incorporating a stray light reduction arrangement, in accordance with the present disclosure.

FIG. 24 is a schematic diagram illustrating a further directional backlight including a stray light reduction arrangement. A spatial light modulator 150 such as a liquid crystal shutter may be arranged between the illuminator elements 100, 102 and the input end 2 of the stepped waveguide 1. The spatial light modulator 150 acts a reflection reduction element arranged to reduce reflections of light incident on the input end 2 after reflection from the reflective end 4, as follows.

The spatial light modulator 150 covers at least the illuminator elements 100, in this example extending across the entirety of the input end 2. The spatial light modulator 150 acts as a shutter and may be a liquid crystal shutter including a switchable liquid crystal layer 156 which may include addressable pixel regions 162, 164, substrates 154, 158, such as glass substrates and optional polarizers 152, 160 such as stretched PVA with iodine preferential absorber, reflective polarizer such as DBEF from 3M Corporation, wire grid polarizers or combination therein. The liquid crystal mode may be, but is not limited to, twisted nematic, super-twisted nematic, guest host, ferroelectric, or any other known modes. The modulator 150 may be proximate to or attached to the surface of the input end 2, to the illuminator array 15 or may be in air. Additional absorption filters 128 and anti-reflective coatings 132 may be arranged as appropriate. Thus, the spatial light modulator 150 acts as a shutter that may be operable so that portions of the spatial light modulator 150 adjacent respective illuminator elements 100 selectively transmit light when the respective illuminator elements 100 is operated and otherwise absorb light incident on the input end 2 after reflection from the reflective end 4.

Further, the elements 100, 102 may be replaced by a continuous illuminator element wherein the shutter 150 acts to achieve the illuminator element array 15. However, such an element may not achieve as high extinction properties as the embodiment of FIG. 24 wherein the illuminator elements are individually controllable.

As illustrated in FIG. 24, light may be emitted from illuminator element 100 and pass through the transmissive region of pixels 162. The light may be reflected from the reflective end 4 and the stray light rays 104 may, at least in part, be directed towards non-illuminated elements 102 and substantially absorbed.

Figure 25:
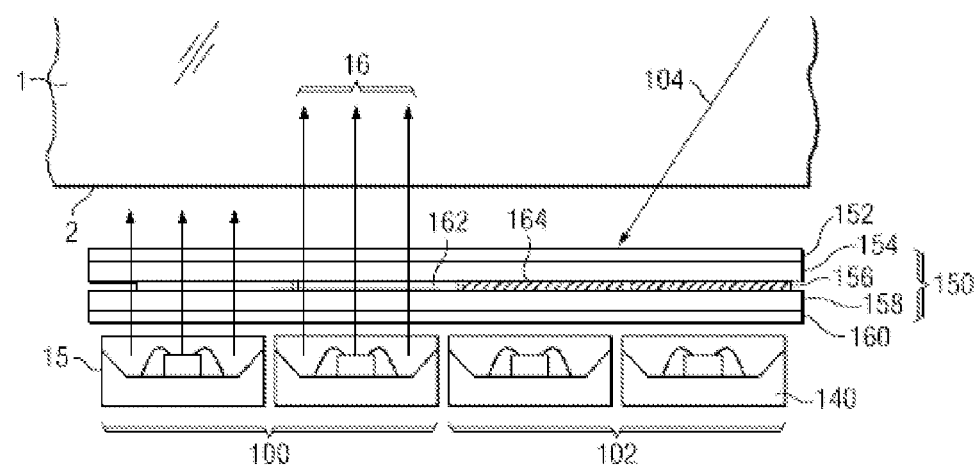
FIG. 25 is a schematic diagram illustrating a detail of a further directional backlight incorporating a stray light reduction arrangement, in accordance with the present disclosure.

FIG. 25 is a schematic diagram illustrating a detail of the further directional backlight of FIG. 24 in one optional construction. In operation, pixels 162 of the spatial light modulator 150 in the region of the illuminator elements 100 may be arranged to be transmissive whereas pixels 164 in the region of non-illuminated illuminator elements 100 may be absorbing to incident light. Thus input rays 16 may be transmitted into the stepped waveguide 1 whereas stray light rays 104 may be directed generally towards non-illuminated illuminator elements 102 and may be absorbed. In this manner, a dynamic filter can be arranged to cooperate with the illumination of the illuminator elements 100, 102 to advantageously reduce cross talk and other stray light artifacts. Further, the response speed of the spatial light modulator may not match the switching response of the illuminator elements, but may be similar to that used in the respective time multiplexed display spatial light modulator.

Continuing the discussion of FIG. 25, the pixels 164 may be arranged to be absorbing for most to all respective aligned illuminator elements other than those for the specific window to be illuminated. Alternatively the pixels may be absorbing in the region of the illuminator array 15 that may result in cross talk to the observer's eye, for example, the illuminator elements that are illuminated in the opposite phase for a given observer position. Advantageously, illuminator elements that are not directed to an observer's eyes can remain illuminated, so that a multi-viewer display in which multiple groups of illuminator elements are illuminated can be provided with low cross talk.

Figure 26:
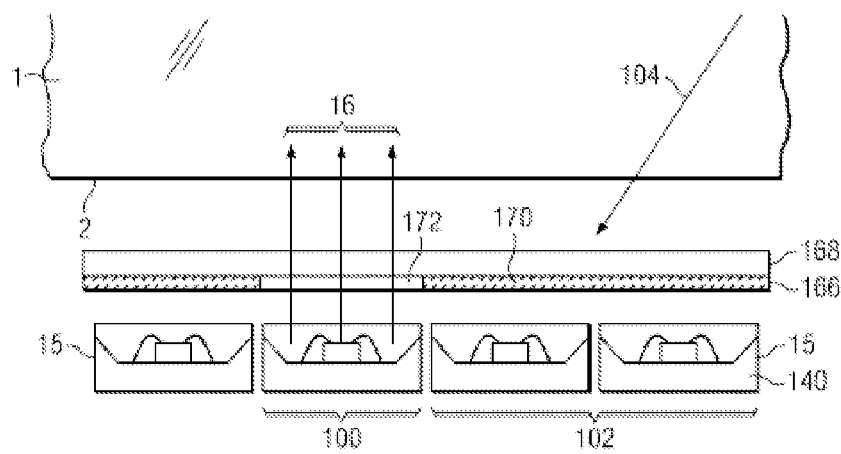
FIG. 26 is a schematic diagram illustrating a detail of a further directional backlight incorporating a stray light reduction arrangement, in accordance with the present disclosure.

FIG. 26 is a schematic diagram illustrating a detail of a further directional backlight including a stray light reduction arrangement. Further, FIG. 26 shows an embodiment including a saturable absorber 166 which may be formed on support substrate 168. The saturable absorber 166 acts a reflection reduction element arranged to reduce reflections of light incident on the input end 2 after reflection from the reflective end 4, as follows.

The saturable absorber 166 covers at least the illuminator elements 100, in this example extending across the entirety of the input end 2. In FIG. 26, the waveguide 1 may receive light rays 16 from the illuminator element 100 of the illumination array 15 at the input end 2, through the region 172. Illuminator element 100 of the illuminator array 15 may include element 140. As illustrated in FIG. 26, adjacent elements 140 may be used for illuminator element 102. In one example, the elements 140 may be LEDs.

In operation, the light intensity of the illuminator element 100 may be substantially higher than the intensity of the returning stray light. Thus in the region 172, the absorber 166 may saturate and become transmitting whereas in region 170 the illuminated intensity may be much lower, and the absorber may be absorbing. As illustrated in FIG. 26, ray 104 may be directed toward region 170, which may substantially absorb the light ray 104. Although the absorber 166 as illustrated has a region 170 and a region 172, the absorber is a layer of material. The region 172 is represented as such for purposes of description and to illustrate that the absorber may become saturated with light in regions and transmit light through the saturated region of absorber 166. Thus, the saturable absorber 166 may be operable so that portions of the saturable absorber 166 adjacent respective illuminator elements 100 selectively transmit light when the respective illuminator elements 100 is operated and otherwise absorb light incident on the input end 2 after reflection from the reflective end 4.

Suitable properties of the saturable absorber 166 are as follows. Saturable absorbers may, for example, be phosphor materials. The relaxation time of the material may be set to be less than the frame rate of the time multiplexed display spatial light modulator. Advantageously such an arrangement may have a less complex construction than a liquid crystal spatial light modulator.

Figure 27:
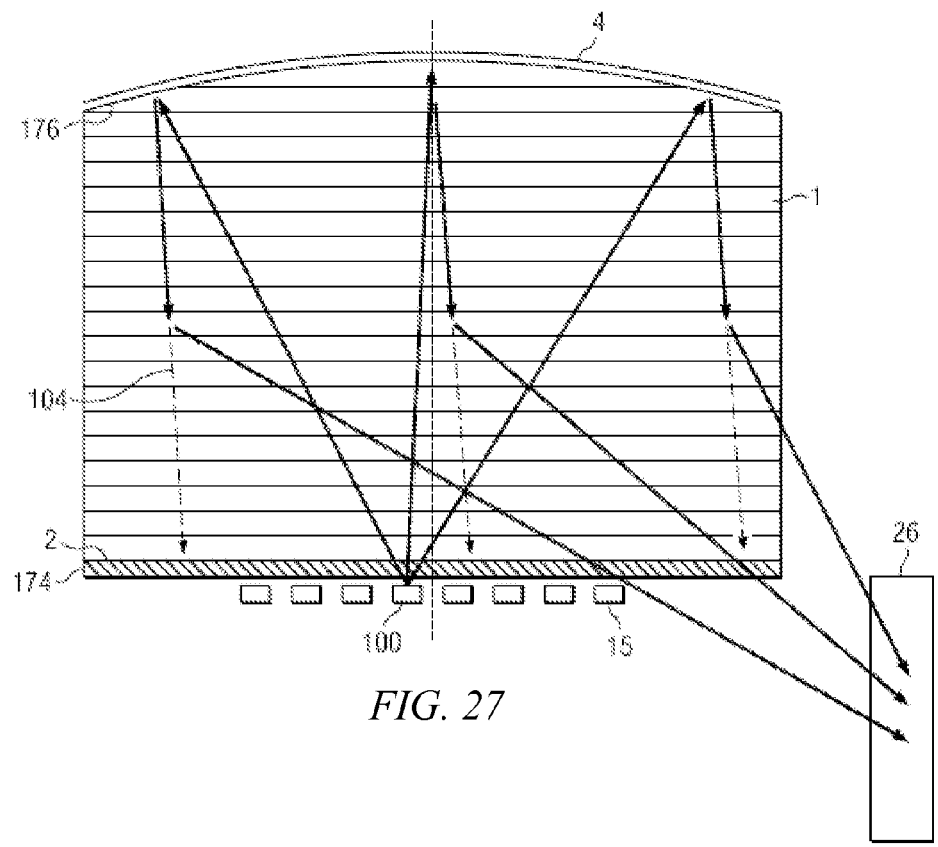
FIG. 27 is a schematic diagram illustrating a directional backlight arranged to reduce stray light propagation, in accordance with the present disclosure.

FIG. 27 is a schematic diagram illustrating a directional backlight arranged to reduce stray light propagation. Further, FIG. 27 shows an embodiment of a directional backlight including a waveguide 1, a linear polarizer 174 arranged at the surface of the input end 2 of the stepped waveguide 1, and a quarter waveplate 176 and a mirror be arranged at the output surface of the reflective end 4 between the guiding portion of the waveguide 1 and reflective end 4. The linear polarizer 174 acts a reflection reduction element arranged to reduce reflections of light incident on the input end 2 after reflection from the reflective end 4, as follows.

Incident light from the illuminator element 100 may be polarized for transmission through an input path of the waveguide 1. The quarter waveplate acts as a phase retarder so that, at the quarter waveplate 176 and mirror surface of the reflective end 4, the polarization may be rotated through approximately 90 degrees so that the opposite polarization state may counter-propagate in the stepped waveguide 1. On incidence at the linear polarizer 174, the counter-propagating stray light rays 104 may thus be absorbed. Advantageously such an arrangement may propagate linear polarization states within the waveguide 1 so that depolarization during TIR at side 6 and features 10 may be minimized (side 6 and features 10 not shown in FIG. 27).

As illustrated in FIG. 27, light may be emitted from illuminator element 100 and pass through the input end 2. The light may be reflected from the reflective end 4 and the stray light rays 104 may, at least in part, be substantially absorbed as previously described. The reflected light may also be directed towards a viewing window 26.

Figure 28:
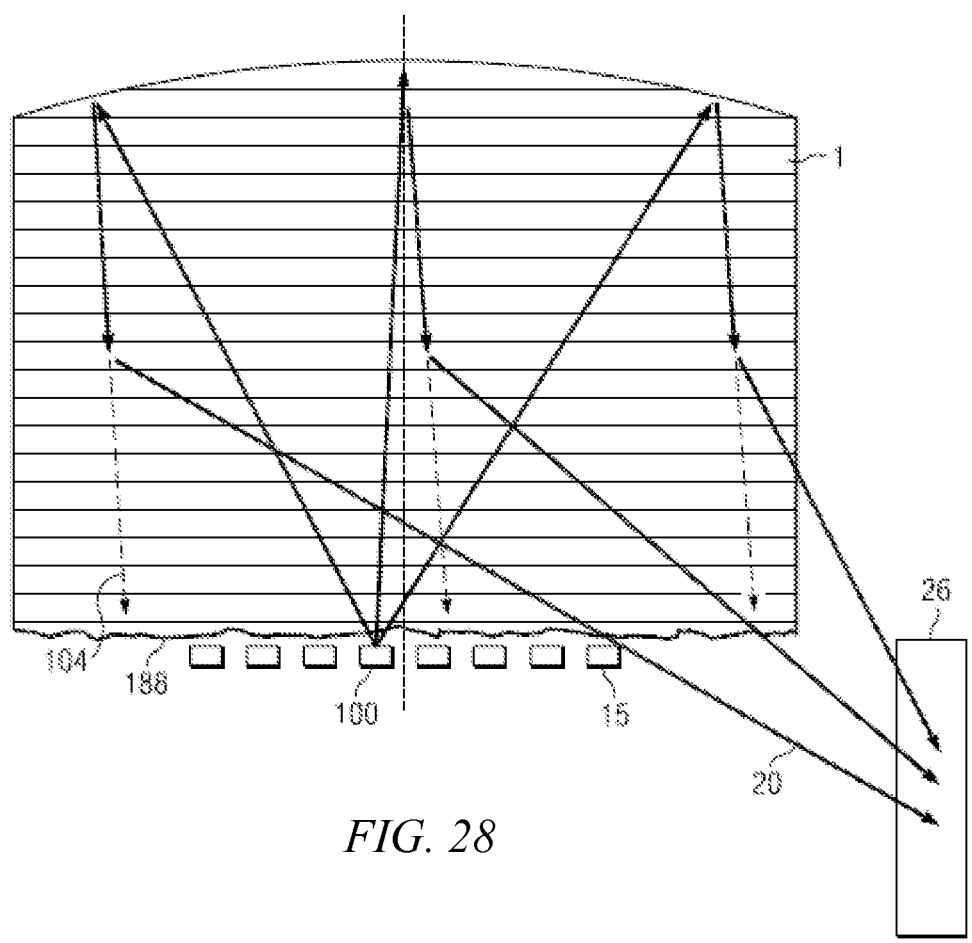
FIG. 28 is a schematic diagram illustrating a directional backlight arranged to reduce stray light propagation including a diffusing element, in accordance with the present disclosure.

FIG. 28 is a schematic diagram illustrating a directional backlight arranged to reduce stray light propagation including a diffusing element, and including a waveguide 1. Further, FIG. 28 shows an embodiment including a surface relief diffusing surface 188 that is attached to the surface of the input end 2 of the stepped waveguide 1 by means of pressure sensitive adhesive layers or by other known attachment methods. The surface relief diffusing surface 188 may extend across the entirety of the input end 2. The surface relief diffusing surface 188 is an example of a light diffusing element and acts a reflection reduction element arranged to reduce reflections of light incident on the input end 2 after reflection from the reflective end 4, as follows.

As illustrated in FIG. 28, the waveguide 1 may receive light from a illumination array 15. More specifically, illuminator element 100 of the illumination array 15 may input light into the input end of the waveguide 1, and the light may reflect off of the reflective end 4 of the waveguide 1. After the light reflects off of the reflective end 4 of the waveguide 1, it may travel in the general direction of the diffusing surface 188. At least some of the light may pass through the diffusing surface 188. As illustrated in FIG. 28, the rays 20 may exit generally in the direction of the window 26. Light rays 104 may be incident on to the diffuser 188 and may be scattered over a wide cone angle. Similarly and as shown in FIG. 17, the specular reflection ray 120 of FIG. 17 may be distributed over a wide cone angle, so that the intensity of light in beams 123 may be reduced. Advantageously the artifact of rays 123 may be minimized.

The diffusing surface 188 may have asymmetric diffusing properties. These properties may increase the output illumination angular spread in substantially a first direction in the plane of the waveguide 1, but provide low diffusion in a plane out of the waveguide 1, to reduce light losses from diffusion in this direction.

Figure 29:
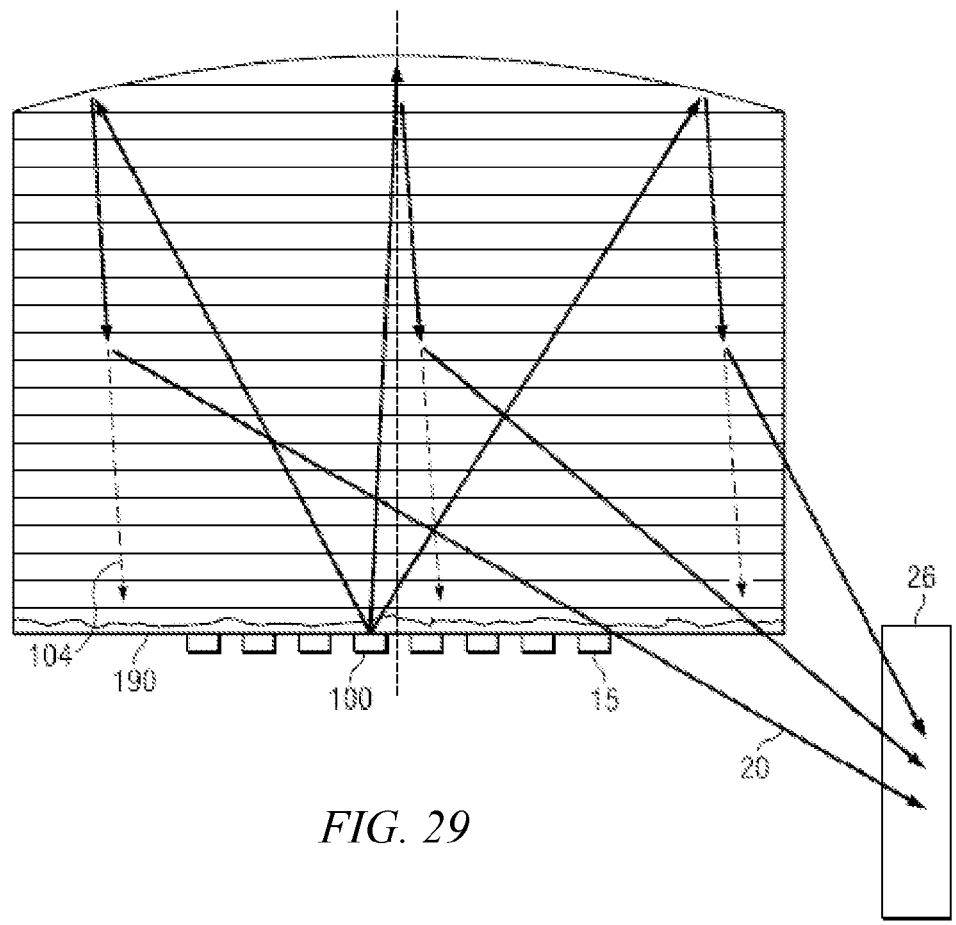
FIG. 29 is a schematic diagram illustrating a directional backlight arranged to reduce stray light propagation including a diffusing element, in accordance with the present disclosure.

Alternatively, the diffusing surface 188 of FIG. 28 may be replaced by a bulk diffuser 190 as shown in FIG. 29, which may further incorporate further cross talk reduction embodiments as described elsewhere. FIG. 29 is a schematic diagram illustrating a directional backlight arranged to reduce stray light propagation, including a waveguide and a bulk diffuser 190 extending across the input end 2 of the waveguide 1. The surface relief diffusing surface 188 is another example of a light diffusing element, and has the same properties as the diffusing surface 188 as discussed above.

There will now be described some further examples of light sources. These light sources may be used in any of the directional backlights and directional display devices disclosed herein.

Figure 30:
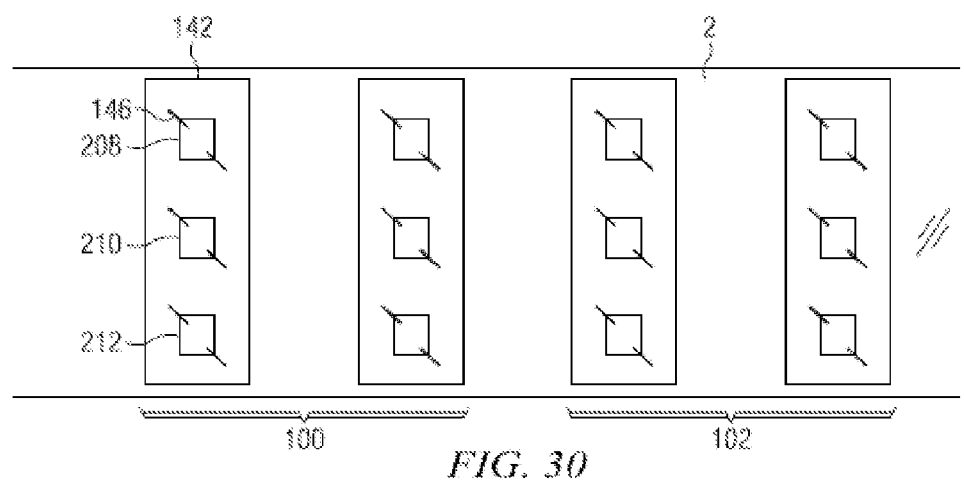
FIG. 30 is a schematic diagram illustrating an arrangement of illuminator elements, in accordance with the present disclosure.
Figure 31:
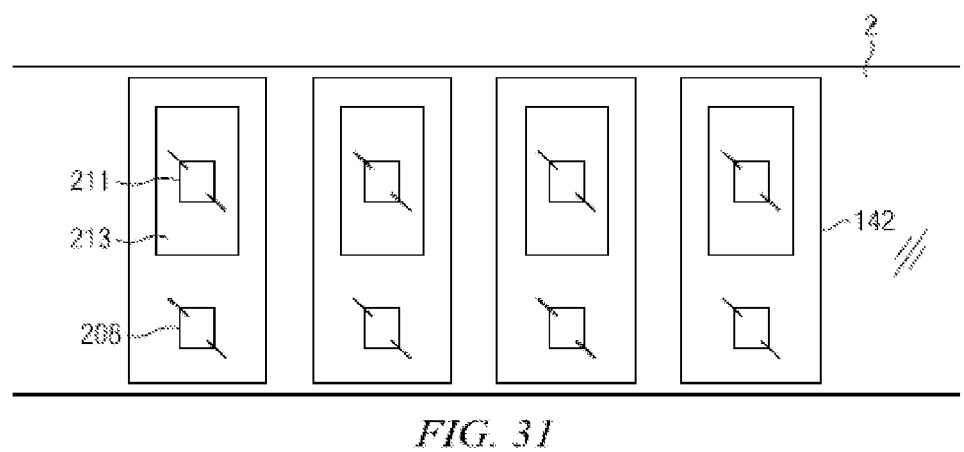
FIG. 31 is a schematic diagram illustrating a further arrangement of illuminator elements, in accordance with the present disclosure.

FIG. 30 is a schematic diagram illustrating an arrangement of illuminator elements. Further, FIG. 30 shows an embodiment which may include a low reflectivity LED array for the arrangement of FIG. 28. In FIG. 30, separate elements 208, 210, 212 may be arranged in a package body 142 and may be positioned at the input end 2 so that the relative lateral position with respect to the waveguide 1 is the same. Alternatively, the bodies 142 may be arranged with red elements 208 together with blue illuminator elements 211 and green phosphor illuminator element 213 as shown in FIG. 31. FIG. 31 is a schematic diagram illustrating a further arrangement of illuminator elements for use with the waveguide 1 of FIG. 18. Advantageously such an arrangement may compensate for poor green LED device efficiency.

Figure 32:
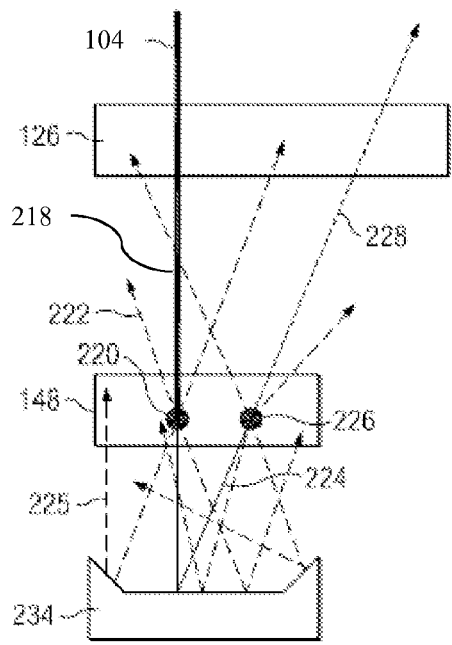
FIG. 32 is a schematic diagram illustrating generation of yellow stray light in a first arrangement of illuminator elements, in accordance with the present disclosure.

FIG. 32 is a schematic diagram illustrating generation of stray light in the conversion band in a first arrangement of illuminator elements. The illuminator elements have the same construction as described above with reference to FIG. 19 but with the following modifications.

The illuminator element includes a package body 234 that is a substrate on which the other components are supported, as described above. The package body 234 may be colored to reflect the emission band preferentially over the conversion band. This provides advantages as follows.

FIG. 32 shows the illumination of a package body 234 by the component ray 218 in the emission band of white stray light ray 104, using the blue transmitting layer 126 that is a filter. On incidence with the phosphor 148 of the illuminator element, a phosphor feature 220 may convert the light in the emission band into scattered light rays 222 and 225 in the conversion band while some light rays 224 in the emission band may pass directly through the phosphor 148 only to reflect back into phosphor 148 off the package body 234, whereon the light may be incident on feature 226. Thus light rays 218 in the emission band may be converted to light in the conversion band rays by phosphor feature 220 on input and by phosphor feature 226 on reflection from package body 234. Converted light rays 225 in the conversion band may also be substantially reflected by package body 234 and may be incident on the layer 126 that is a filter. Unconverted rays 228 in the emission band may be substantially directly reflected. Thus light rays 218 in the emission band may undergo substantial conversion to light rays in the conversion band on reflection, so that the reflection artifact may be biased to the conversion band of the phosphor 148.

Figure 33:
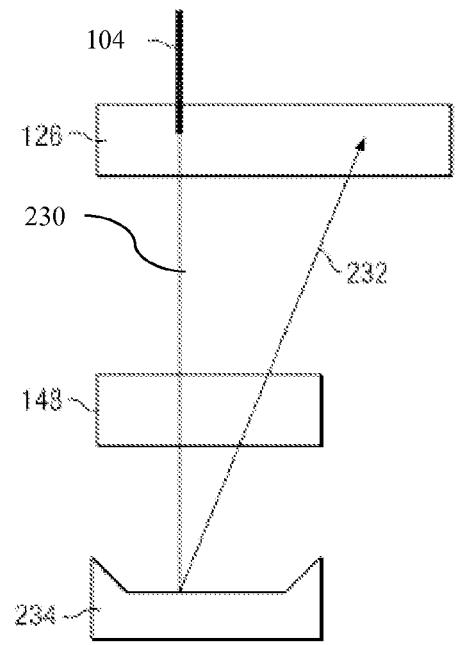
FIG. 33 is a schematic diagram illustrating generation of blue stray light in the first arrangement of illuminator elements, in accordance with the present disclosure.

FIG. 33 is a schematic diagram illustrating generation of stray light in the emission band in the first arrangement of illuminator elements. FIG. 33 shows the illumination of a (white) package body 234 by the yellow component ray 230 of white light ray 104, using the blue transmitting filter 126. This light is partially absorbed by the filter 126 and is reflected by the package 234.

Figure 34:
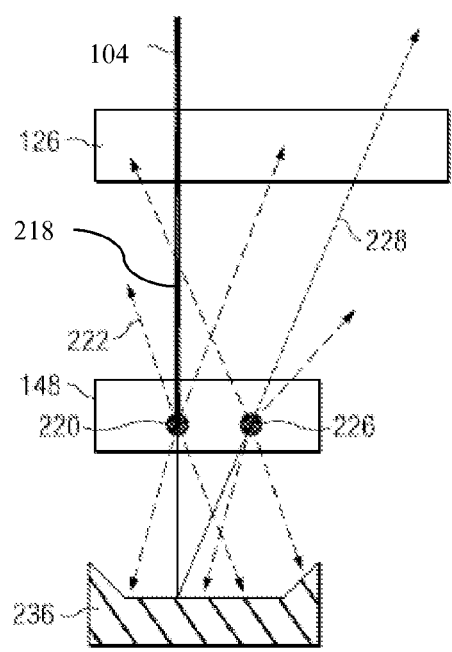
FIG. 34 is a schematic diagram illustrating generation of yellow stray light in an alternative arrangement of illuminator elements, in accordance with the present disclosure.

FIG. 34 is a schematic diagram illustrating generation of stray light in the conversion band in an alternative arrangement of illuminator elements. Further, FIG. 34 shows an embodiment in which the package body 234 of FIG. 32 may be replaced by a package body 236 that is absorbing in the conversion band. In this embodiment, rays 222 in the conversion band may be scattered towards the package body 236, and thus the reflectivity of the package body 236 may be reduced.

Figure 35:
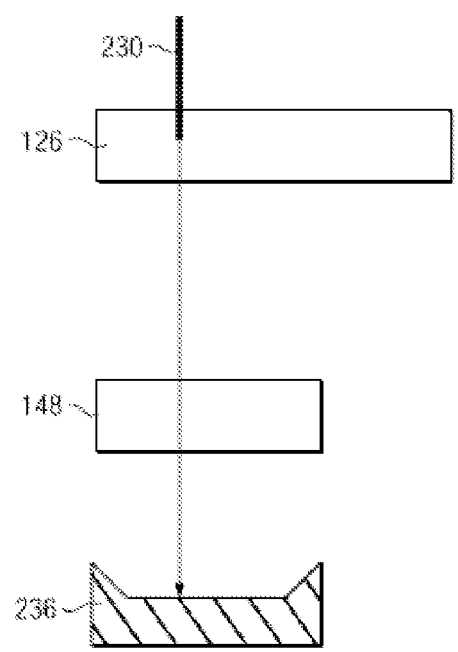
FIG. 35 is a schematic diagram illustrating generation of blue stray light in the alternative arrangement of illuminator elements, in accordance with the present disclosure.

FIG. 35 is a schematic diagram illustrating generation of stray light in the emission band in the alternative arrangement of illuminator elements. Further, as shown in FIG. 35, incident light rays 230 in the conversion band may be absorbed. Thus the color of the package 236 may advantageously reduce the light reflectivity of the package in the conversion band, improving the cross talk. A further advantage of the colored package 236 may be improved use of light in the emission band compared to a black package body.

FIG. 36 is a schematic diagram illustrating an arrangement for illuminating a waveguide 1 including an ultra-violet illuminator element. Further, FIG. 36 shows a further embodiment which may include red phosphor 242 and green phosphor 244 arranged to provide further reduction in reflected light from illuminator array 15. UV emitting chip 241 may illuminate a stack of red, green and blue phosphors 242, 244, 246 respectively to provide diffuse visible light rays 248. As shown in FIG. 37, returning stray light rays 250 may be incident on phosphors 242, 244, 246 may scatter to rays 252 or may be transmitted to the package 240 which may appear black to white light but reflective to UV radiation. FIG. 37 is a schematic diagram illustrating generation of stray light in an alternative arrangement of illuminator elements. In the embodiment of FIG. 37, the input and output illuminator element may be distinguished, and light back scattered from the phosphor may be returned to the stepped waveguide 1.

FIG. 38 is a schematic diagram illustrating in front view an arrangement of illuminator elements and FIG. 39 is a schematic diagram illustrating in side view, the arrangement of FIG. 38. Further, FIG. 38 shows in front view and FIG. 39 shows in side view a further embodiment of illuminator array 15 in which LED chips 144, wire bonds 146, and phosphors 148 may be arranged in landscape mode with respect to the input end 2 of a stepped waveguide 1. A black insulator 254 and metal base layer 256 may form a low reflectivity metal core printed circuit board (MCPCB).

It should be noted that the elements in FIG. 38 are illustrated as such for discussion purposes only and not of limitation, as elements of FIG. 38 may not be drawn to scale. The light emitting regions of the illuminator elements may each include a light generation element arranged to generate light in the emission band and a wavelength conversion material arranged to convert light in the emission band generated by the light generation element into light in the conversion band.

Figure 40A:
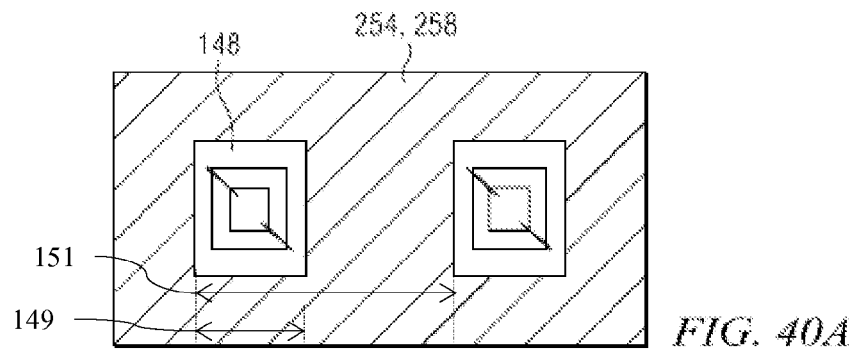
FIG. 40A is a schematic diagram illustrating in front view an arrangement of illuminator elements to provide reduced stray light in a waveguide, in accordance with the present disclosure.
Figure 40B:
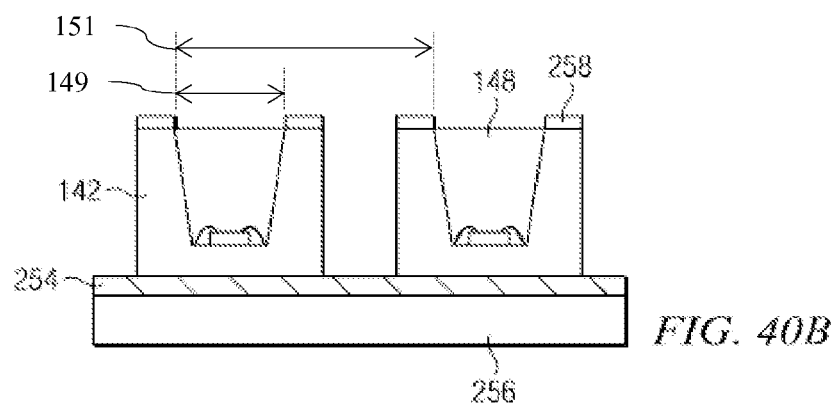
FIG. 40B is a schematic diagram illustrating in side view, the arrangement of FIG. 40A, in accordance with the present disclosure.

FIG. 40A is a schematic diagram illustrating in front view an arrangement of illuminator elements to provide reduced stray light in a waveguide and FIG. 40B is a schematic diagram illustrating in side view the arrangement of FIG. 40A. Further, FIG. 40A shows in front view and FIG. 40B shows in side view, another embodiment of illuminator elements in which the thickness of the phosphor 148 may be increased and the area may be reduced when compared to FIGS. 38 and 39, as follows.

An absorbing mask including regions 254 and 258 may be incorporated between the phosphor regions, to further reduced the reflectivity of the package, while maintaining brightness and color temperature. In this illuminator element, the area of the phosphor is the light emitting region. In a lateral direction along the input end 2 in which the illuminator elements are arrayed, the width 149 of the light emitting region is thus approximately at or below 50% of the pitch 151 of the illuminator elements. Thus the area of the reflecting portion of the illuminator elements may be reduced, so the cross-talk may be advantageously reduced.

Advantageously, the area of the phosphor may be less than approximately 500% of the area of the blue emitter, less than 300% of the area of the blue emitter, or less than 200% of the area of the blue emitter.

Figure 41A:
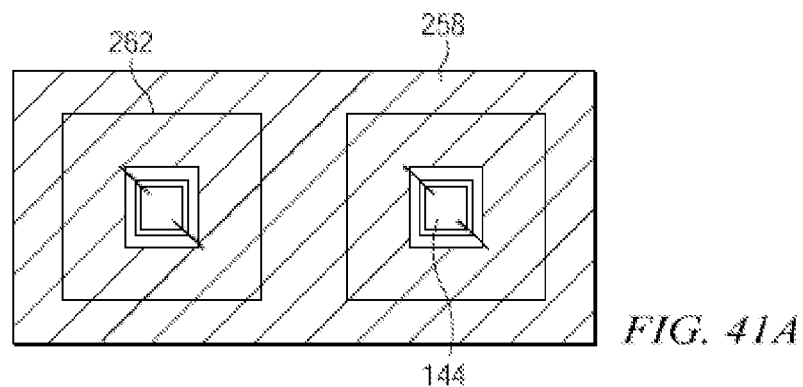
FIG. 41A is a schematic diagram illustrating in front view an arrangement of illuminator elements to provide reduced stray light in a waveguide, in accordance with the present disclosure.
Figure 41B:
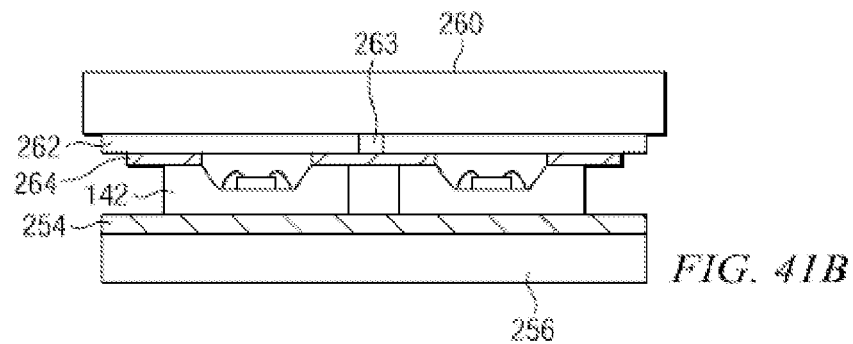
FIG. 41B is a schematic diagram illustrating in side view, the arrangement of FIG. 41A, in accordance with the present disclosure.

FIG. 41A is a schematic diagram illustrating in front view an arrangement of illuminator elements to provide reduced stray light in a waveguide and FIG. 41B is a schematic diagram illustrating in side view, the arrangement of FIG. 41A. Further, FIG. 41A shows in front view and FIG. 41B shows in side view, a further embodiment of illuminator elements in which the on chip phosphor 148 may be replaced by a remote phosphor 262 that may be separated by gaps 263 or may be provided in a continuous layer. Light in the emission band from the LED chip 144 may be incident on the remote phosphor 262 and may scatter within the layer to produce light in the conversion band. Stray light rays 104 may be incident on the layer area phosphor, some of which may be scattered backscattered into the stepped waveguide 1. However, the light that passes through the phosphor 262 may be absorbed in regions 258. Advantageously cross talk may be reduced. Further, remote phosphors may demonstrate higher efficiency because of the lower operating temperature.

Figure 42A:
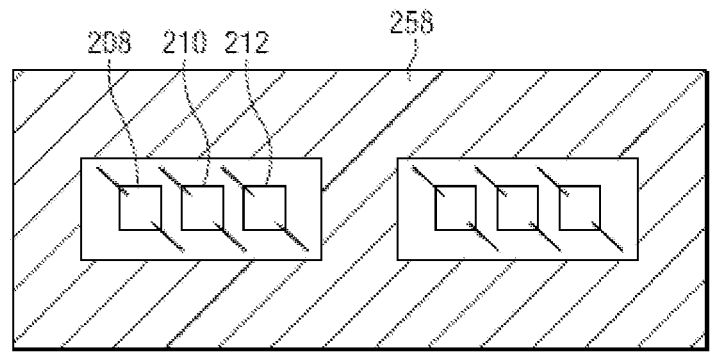
FIG. 42A is a schematic diagram illustrating in front view an arrangement of illuminator elements to provide reduced stray light in a waveguide, in accordance with the present disclosure.
Figure 42B:
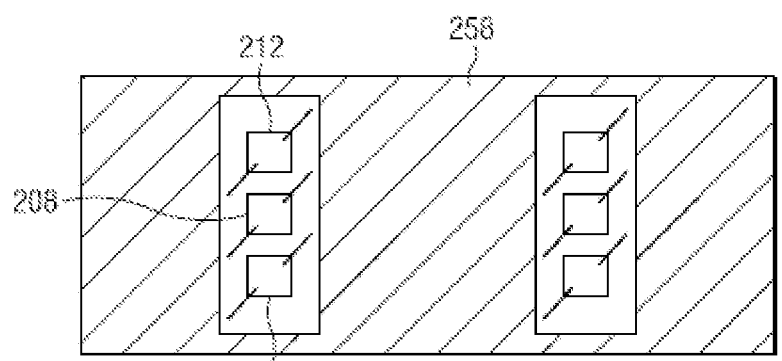
FIG. 42B is a schematic diagram illustrating in front view an alternative arrangement of illuminator elements to provide reduced stray light in a waveguide, in accordance with the present disclosure.

FIG. 42A is a schematic diagram illustrating in front view, an arrangement of illuminator elements to provide reduced stray light in a waveguide. Further, FIG. 42A shows in front view, a further embodiment of illuminator elements in which separate red, green and blue illuminator elements 208, 210, 212 may be arranged with surrounding region 258 arranged to substantially absorb incident light. In this manner, the chip area may be minimized when compared to the area of the input end 2. Further the height of side 2 may be reduced to increase optical valve efficiency, reducing the relative amount of light that falls onto the side 2. FIG. 42B is a schematic diagram illustrating in front view an alternative arrangement of illuminator elements to provide reduced stray light in a waveguide. Further, FIG. 42B shows a further embodiment in which the elements 208, 210, 212 may be arranged in portrait orientation to advantageously avoid color separation of viewing windows in the window plane.

Figure 42C:
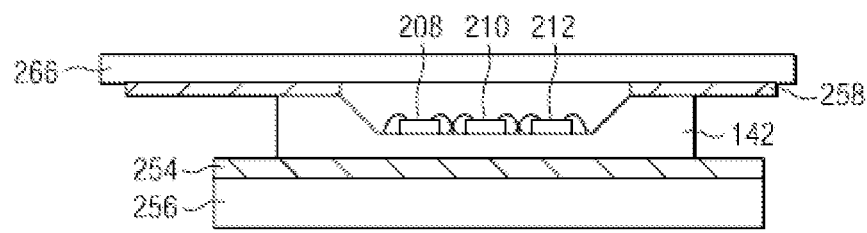
FIG. 42C is a schematic diagram illustrating in side view, the arrangement of FIGS. 42A and 42B, in accordance with the present disclosure.

FIG. 42C is a schematic diagram illustrating in side view, the arrangement of FIGS. 42A and 42B. Further, FIG. 42C shows in side view, an arrangement of red, green and blue illuminator elements 208, 210, 212 including a further substrate 266 which may include regions 258 formed thereon. Advantageously, a defined mask pattern can be arranged in approximate alignment with an array of illuminator elements to substantially control the position of illuminator elements in addition to providing absorption of stray light rays 104.

The present embodiments may include illuminator elements that are relatively small compared to the gaps between the elements. In an illustrative embodiment a light source array may be arranged to illuminate a spatial light modulator with a 15.6 inch diagonal size with a 600 mm viewing distance. Inorganic phosphor converted LEDs with a pitch 151 of 2 mm may be arranged with an emitting aperture width 149 of 0.9 mm. Such an arrangement may achieve of the order of ten interocular optical windows in the window plane, depending on the detailed optical design. The pitch of the LEDs may vary between 0.5 mm or less and 5 mm or greater for example, depending on the number of optical windows required per viewing window. In the present embodiments the emitting aperture of the LEDs may vary between 10% and 50% of pixel pitch for example.

In other embodiments the LED emitting aperture width may be increased to greater than 50% of pixel pitch in order to achieve increased window uniformity. However, such an arrangement may show increased cross talk in comparison with the present embodiments. Further the aspect ratio defined by the ratio of width 149 to pitch 151 may be non-uniform across the input aperture of the waveguide to achieve varying optical properties with viewing angle. Advantageously the display may be arranged for high cross talk performance on-axis and improved illumination uniformity off-axis.

Further, additional diffusers 68 may be arranged between the illuminator elements and the input end 2. Additionally, the diffusers 68 may be preferably arranged at the input to a display apparatus, such as between the stepped waveguide and the input to a transmissive spatial light modulator 48. The diffusers may have asymmetric diffusion properties to provide substantially controlled mixing between illuminator elements in a lateral direction while providing a high degree of diffusion in the orthogonal direction. In one illustrative embodiment an approximately 3°×30° diffuser may be employed for an approximately 15.6" display viewed from approximately 500 mm. An array of illuminator elements on an approximately 2 mm pitch may be arranged in the illuminator array 15, and imaged by a mirror on side 4 which may provide a system magnification of approximately 5, so that an approximately 13 mm window pitch may be achieved. An approximately 3 degree diffuser may result in an effective blurring of illumination at the plane of the illuminator array 15 of approximately 4 mm, so that from any viewing position, light from two adjacent illuminator elements may be viewed by an observer and a substantially uniform output intensity profile may be achieved in the window plane, substantially irrespective of aperture ratio of the illuminator elements. Thus, reducing the aperture size of the emitting region of the respective illuminator element advantageously may achieve a reduction in cross talk, while maintaining window uniformity.

Figure 43A:
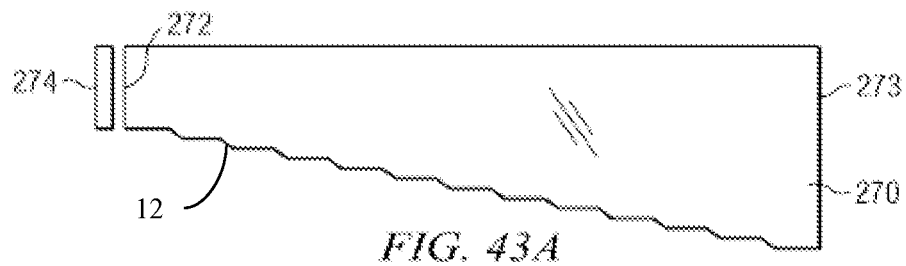
FIG. 43A is a schematic diagram illustrating a first directional backlight with a first stray light contribution, in accordance with the present disclosure.
Figure 43B:
FIG. 43B is a schematic diagram illustrating a second directional backlight with a second stray light contribution, in accordance with the present disclosure.

FIG. 43A is a schematic diagram illustrating a first optical valve with first stray light contribution. Further, FIG. 43A shows a further embodiment including a waveguide 270 with an input end 272 approximately aligned to a illuminator element 274 arranged with a portrait orientation. The collection aperture of such a waveguide 270 may be approximately determined by the ratio of the difference in height of the input end 272 and the reflective end 273 to the height of the reflective end 273 of the stepped waveguide. In an illustrative embodiment waveguide 270 may have a height of reflective end 273 of 4 mm and an input end 272 height of 1 mm, so that approximately 25% of light reflected by the end 273 is incident on end 272 while the approximately 75% of reflected light is incident on features 12 of the waveguide 270 and is thus extracted. Thus 25% of reflected light may contribute to reflective artifacts in the display. By way of comparison, as shown in FIG. 43B, a stepped waveguide 276 in which the overall thickness may be reduced but the total height of features 12 along the length of the stepped waveguide maintained, may advantageously achieve higher output efficiency. FIG. 43B is a schematic diagram illustrating a second optical valve with second stray light contribution. Thus a landscape orientation illuminator element 280 at the input end 278 and after reflection at side 279 by features 12 may achieve more efficient output than for the optical valve 270 or FIG. 43A. Further, such an arrangement of stepped waveguide 276 of FIG. 43B, may reduce the flux of stray light rays 104 incident on the side 278 when compared to the light incident on the side 272, thus reducing cross-talk in the system. In an illustrative embodiment waveguide 276 may have a height of reflective end 279 of 4 mm and an input end 278 height of 0.5 mm, so that approximately 12.5% of light reflected by the end 279 is incident on end 272 while the approximately 87.5% of reflected light is incident on features 12 of the waveguide 276 and is thus extracted. Thus 12.5% of reflected light may contribute to reflective artifacts in the display. Advantageously, the smaller height of end 279 increases efficiency and reduces cross talk and other artifacts arising from light falling on the input end.

Figure 44:
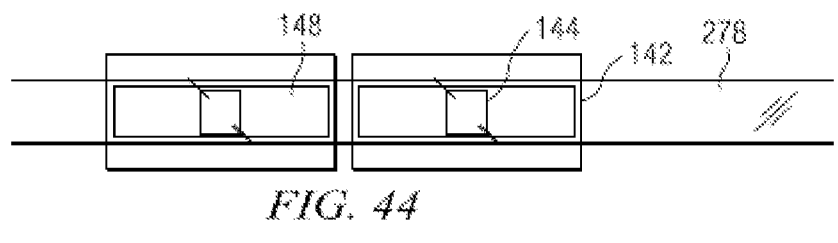
FIG. 44 is a schematic diagram illustrating in front view an arrangement of illuminator elements to reduce stray light in a waveguide, in accordance with the present disclosure.

FIG. 44 is a schematic diagram illustrating in front view, an arrangement of illuminator elements to reduce stray light in a waveguide. Further, FIG. 44 shows a pair of illuminator elements of an illuminator array 15 arranged in landscape orientation and approximately aligned with respect to input end 278 of the waveguide. Phosphor regions 148 may advantageously be arranged to have approximately the same height as the height of the input end 278, to efficiently couple the emitted light into the stepped waveguide 276.

Figure 45:
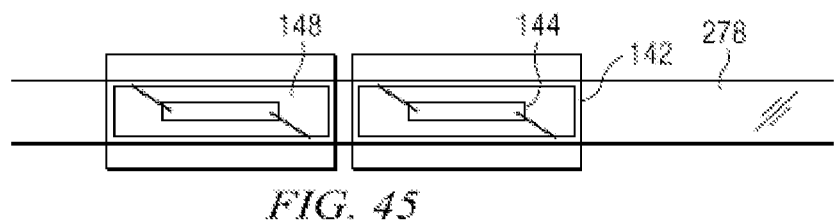
FIG. 45 is a schematic diagram illustrating in front view an alternative arrangement of illuminator elements to reduce stray light in a waveguide, in accordance with the present disclosure.

FIG. 45 is a schematic diagram illustrating in front view an alternative arrangement of illuminator elements to reduce stray light in a waveguide. Further, FIG. 45 shows an alternative embodiment in which the emitting chip 144 may be arranged with an elongate shape so that the output window structure is similar for blue (direct) and yellow (phosphor converted) light. In this manner, the height of the input end 278 of the waveguide can be minimized, and thus the relative proportion of stray light ray 104 may be reduced when compared to the light output by features 12. Furthermore, the light output by features 12 may be advantageously increased.

Figure 46:
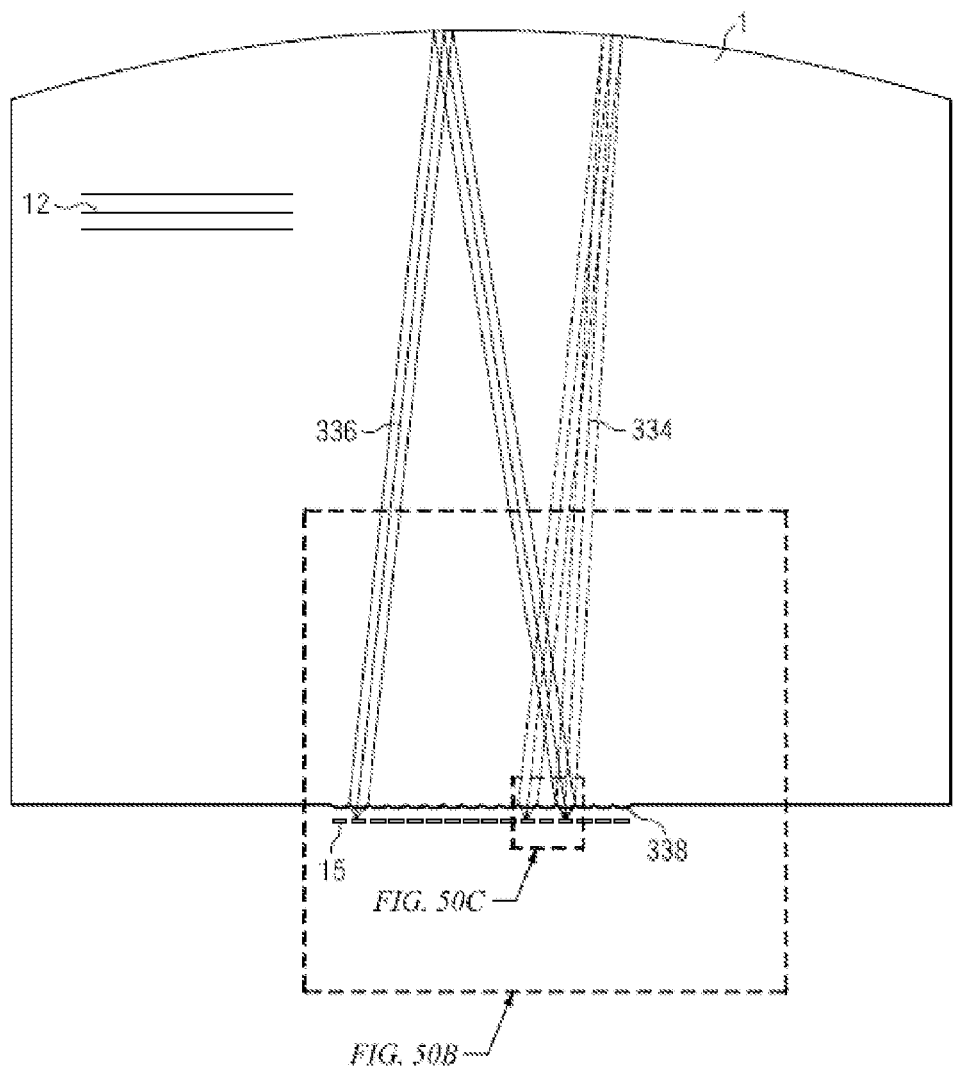
FIG. 46 is a schematic diagram illustrating at a first scale the operation of a waveguide including an input array of focusing optics, in accordance with the present disclosure.
Figure 47:
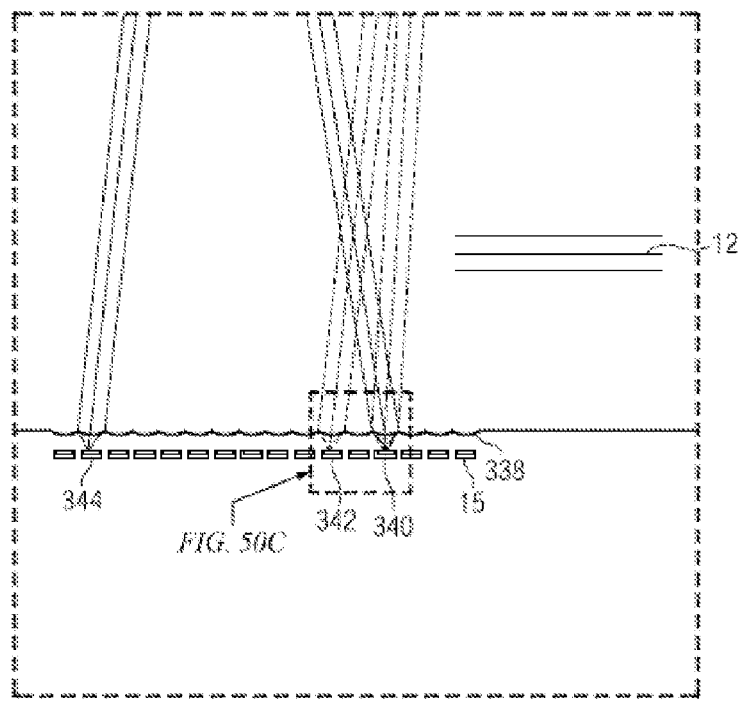
FIG. 47 is a schematic diagram illustrating at a second scale the operation of a waveguide including an input array of focusing optics, in accordance with the present disclosure.
Figure 48:
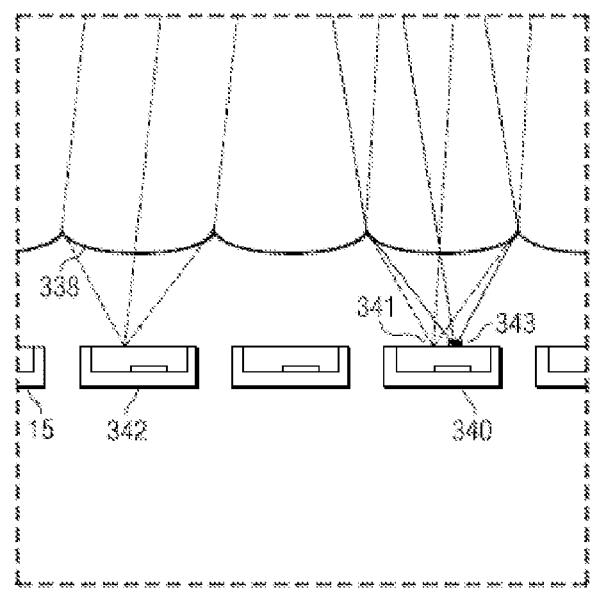
FIG. 48 is a schematic diagram illustrating at a third scale the operation of a waveguide including an input array of focusing optics and arranged to provide reduced stray light, in accordance with the present disclosure.

FIG. 46 is a schematic diagram illustrating at a first scale the operation of a waveguide including an input array of focusing optics, FIG. 47 is a schematic diagram illustrating at a second scale the operation of a waveguide including an input array of focusing optics, and FIG. 48 is a schematic diagram illustrating at a third scale the operation of a waveguide including an input array of focusing optics and arranged to provide reduced stray light. Further, FIGS. 46, 47 and 48 show first, second and third front views at varying scales of imaging of light by a stepped waveguide 1. Each illuminator element of illuminator array 15 may be approximately aligned with a microlens of a microlens array 338 at the input end 2 of a stepped waveguide 1. In operation, and assuming near perfect imaging by the optical system, stray light rays 334 from an emission region 341 on a illuminator element 340 of illuminator array 15, may be imaged to a second illuminator element 342 in the illuminator array 15, and stray light rays 336 from region 343 may be imaged to a third illuminator element 344. If a mask is thus placed in the region 343, then little to substantially no stray light may be incident on to illuminator element 344, while similarly light from element 344 may be incident on the mask 345. Thus a single mask may substantially remove cross talk for both respective regions on respective elements. Thus the illuminator elements may include mask features within the emitting aperture of some of the illuminator elements.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A directional backlight for a transmissive spatial light modulator, comprising:
   a waveguide having an input end, first and second, opposed guide surfaces for guiding light along the waveguide, and a reflective end facing the input end for reflecting light from the input light back through the waveguide;
   an array of light sources arranged to output light predominantly in an emission band and in a conversion band, the light sources being disposed at different input positions in a lateral direction across the input end of the waveguide, the waveguide being arranged to direct input light from light sources at the different input positions across the input end after reflection from the reflective end as output light through the first guide surface for supply through a transmissive spatial light modulator into respective optical windows in output directions distributed in the lateral direction in dependence on the input positions; and
   a reflection reduction element arranged to reduce reflections of light incident on the input end after reflection from the reflective end, wherein each of the light sources comprise a light generation element arranged to generate light in the emission band and a wavelength conversion material arranged to convert at least some of the light in the emission band generated by the light generation element into light in the conversion band.

2. The directional backlight according to claim 1, wherein the reflection reduction element is a light diffusing element.

3. The directional backlight according to claim 2, wherein the light diffusing element has asymmetric light diffusing properties.

4. The directional backlight according to claim 1, wherein the reflection reduction element extends across the entirety of the input end.

5. The directional backlight according to claim 1, wherein the reflection reduction element comprises a light absorptive layer extending across parts of the input end outside the light sources.

6. The directional backlight according to claim 1, wherein the light generation element comprises a semiconductor diode.

7. The directional backlight according to claim 1, wherein the wavelength conversion material is a phosphor.

8. The directional backlight according to claim 1, wherein the emission band is blue light and the conversion band is yellow light.

9. The directional backlight according to claim 1, wherein the reflection reduction element comprises a filter, disposed between the input end and the array of light sources, and arranged to absorb light in the conversion band preferentially over light in the emission band.

10. The directional backlight according to claim 1, wherein the reflection reduction element comprises, disposed between the input end and each of the light sources, at least one light absorbing element covering part of the area of the respective light source and arranged to absorb light after reflection from the reflective end.

11. The directional backlight according to claim 10, wherein the at least one light absorbing element comprises plural light absorbing elements covering part of the area of the respective light source.

12. The directional backlight according to claim 10, wherein the at least one light absorbing element comprises at least two layers including a layer facing the waveguide arranged to absorb light after reflection from the reflective end and a layer facing the light respective light source arranged to reflect light incident thereon.

13. The directional backlight according to claim 10, wherein the light sources comprise a light generation element arranged to generate light in the emission band and a wavelength conversion material arranged to convert at least some of the light in the emission band generated by the light generation element into light in the conversion band.

14. The directional backlight according to claim 1, wherein the first guide surface is arranged to guide light by total internal reflection and the second guide surface comprises a plurality of light extraction features oriented to reflect light guided through the waveguide in directions allowing exit through the first guide surface as the output light.

15. The directional backlight according to claim 14, wherein the light extraction features are facets of the second guide surface.

16. The directional backlight according to claim 15, wherein the second guide surface has a stepped shape comprising said facets and intermediate regions between the facets that are arranged to direct light through the waveguide without extracting it.

17. The directional backlight according to claim 1, wherein the first guide surface is arranged to guide light by total internal reflection and the second guide surface is substantially planar and inclined at an angle to reflect light in directions that break the total internal reflection for outputting light through the first guide surface,
the display device further comprising a deflection element extending across the first guide surface of the waveguide for deflecting light towards the normal to the spatial light modulator.

18. The directional backlight according to claim 1, wherein the reflective end has positive optical power in the lateral direction.

19. A display device comprising:
a directional backlight for a transmissive spatial light modulator, comprising:
    a waveguide having an input end, first and second, opposed guide surfaces for guiding light along the waveguide, and a reflective end facing the input end for reflecting light from the input light back through the waveguide;
    an array of light sources arranged to output light predominantly in an emission band and in a conversion band, the light sources being disposed at different input positions in a lateral direction across the input end of the waveguide, the waveguide being arranged to direct input light from light sources at the different input positions across the input end after reflection from the reflective end as output light through the first guide surface for supply through a transmissive spatial light modulator into respective optical windows in output directions distributed in the lateral direction in dependence on the input positions; and
    a reflection reduction element arranged to reduce reflections of light incident on the input end after reflection from the reflective end, and
    a control system arranged to selectively operate the light sources to direct light into viewing windows corresponding to said output directions;
wherein the transmissive spatial light modulator is arranged to receive the output light from the directional backlight and comprising an array of pixels arranged to modulate light passing therethrough.

20. The display device according to claim 19, being an autostereoscopic display device wherein the control system is further arranged to control the display device to display temporally multiplexed left and right images and synchronously to direct the displayed images into viewing windows in positions corresponding to left and right eyes of an observer.

21. The display device according to claim 20, wherein the control system further comprises a sensor system arranged to detect the position of an observer across the display device, and
the control system is arranged to direct the displayed images into viewing windows in positions corresponding to left and right eyes of an observer, in dependence on the detected position of the observer.

22. A directional backlight for a transmissive spatial light modulator, comprising:
a waveguide having an input end, first and second, opposed guide surfaces for guiding light along the waveguide, and a reflective end facing the input end for reflecting light from the input light back through the waveguide;
an array of light sources arranged to output light predominantly in an emission band and in a conversion band, the light sources being disposed at different input positions in a lateral direction across the input end of the waveguide, the waveguide being arranged to direct input light from light sources at the different input positions across the input end as output light through the first guide surface after reflection from the reflective end for supply through a transmissive spatial light modulator into respective optical windows in output directions distributed in the lateral direction in dependence on the input positions,
wherein the light sources have respective light emitting regions having a width, in a direction along the input end in which the light sources are arrayed, which is at or below 50% of the pitch of the light sources, wherein the light emitting regions of the light sources each comprise a light generation element arranged to generate light in the emission band and a wavelength conversion material arranged to convert light in the emission band generated by the light generation element into light in the conversion band,
wherein the light generation element comprises a semiconductor diode,
wherein the wavelength conversion material is a phosphor, and
wherein the emission band is blue light and the conversion band is yellow light.

23. The directional backlight according to claim 22, wherein the first guide surface is arranged to guide light by total internal reflection and the second guide surface comprises a plurality of light extraction features oriented to reflect light guided through the waveguide in directions allowing exit through the first guide surface as the output light,
wherein the light extraction features are facets of the second guide surface,
and further wherein the second guide surface has a stepped shape comprising said facets and intermediate regions between the facets that are arranged to direct light through the waveguide without extracting it.

24. The directional backlight according to claim 22, wherein the first guide surface is arranged to guide light by total internal reflection and the second guide surface is substantially planar and inclined at an angle to reflect light in directions that break the total internal reflection for outputting light through the first guide surface,
the directional backlight further comprising a deflection element extending across the first guide surface of the waveguide for deflecting light towards the normal to the spatial light modulator.

25. The directional backlight according to claim 22, wherein the reflective end has positive optical power in the lateral direction.

* * * * *